United States Patent [19]
Koino et al.

[11] Patent Number: 5,615,348
[45] Date of Patent: Mar. 25, 1997

[54] MICROPROCESSOR HAVING REGISTER BANK ARCHITECTURE

[75] Inventors: Seiji Koino, Tokyo; Toshiyuki Yaguchi; Yuriko Kyuma, both of Kanagawa-ken, all of Japan

[73] Assignee: Kabushiki Kaisha Toshiba, Kawasaki, Japan

[21] Appl. No.: 322,468

[22] Filed: Oct. 14, 1994

[30] Foreign Application Priority Data

Oct. 15, 1993 [JP] Japan .................................. 5-258466

[51] Int. Cl.$^6$ .................................................. G06F 9/46
[52] U.S. Cl. ................... 395/569; 395/800; 395/421.03; 395/405; 395/492; 395/591; 364/DIG. 2; 364/931.55; 364/933; 364/955.3
[58] Field of Search ..................... 395/800, 375, 395/421.03, 405, 492

[56] References Cited

U.S. PATENT DOCUMENTS

| | | | |
|---|---|---|---|
| 4,733,346 | 3/1988 | Tanaka | 395/375 |
| 5,276,820 | 1/1994 | Ikenaga et al. | 395/375 |

FOREIGN PATENT DOCUMENTS

| | | |
|---|---|---|
| 0383342 | 8/1990 | European Pat. Off. . |
| 0538817 | 4/1993 | European Pat. Off. . |

OTHER PUBLICATIONS

Huguett; "A C–Oriented Register Set Design"; Chapter 3; pp. 58–94; 1985.
Lang et al. "Reduced Register Saving/Restoring in a Single–Window Register Files"; Jun. 1986.
Furht; "A RISC Architecture with Two–Size, Overlapping Register Windows"; IEEE, Apr. 1988.
Maejma et al; "A 16–bit Microprocessor with Multi–Register Bank Architecture"; Nov. 1986.
"Allocated Bits for Machines with Vector Registers", IBM Technical Disclosure Bullentin, vol. 33, No. 3A, Aug. 1990, pp. 310–314.
"Technique to Improve Context Switching Performance in a CPU", IBM Technical Disclosure Bullentin, vol. 33, No. 3B, Aug. 1990, pp. 472–473.

*Primary Examiner*—Larry D. Donaghue
*Attorney, Agent, or Firm*—Foley & Lardner

[57] ABSTRACT

A microprocessor having a register bank architecture has n register banks, a memory, a bus for connecting the register bank and the memory, and a bank controller for controlling store/load operations between the register banks and the memory. The controller has a current bank pointer indicating data region of the register banks and the memory during the data store/load operations, and a bank size designation register indicating a bank size to be stored/loaded during the store/load operations. When an address of the current bank pointer is set in an destination operand in an instruction, the controller receives the contents of the current bank pointer and bank size designation register. The controller controls the store operation for the n register banks based on the current bank pointer and the bank size designation register, and changes the content of the current bank pointer with the content of the destination operand in the instruction after the completion of the data store operation, receives the content of the current bank pointer and the content of the bank size designation register, and controls the load operation for the memory by the contents of the current bank pointer and bank size designation register.

16 Claims, 25 Drawing Sheets

5,615,348

MICROPROCESSOR HAVING REGISTER BANK ARCHITECTURE

BACKGROUND OF THE INVENTION

1. Field of the Invention

The present invention relates to a microprocessor having a register bank architecture in which a built-in RAM and general-purpose registers are connected through an exclusive high-speed bus in order to that the contents of the general-purpose registers agree with the contents of the built-in RAM specified by a bank pointer, and, in particular, to a microprocessor having a register bank architecture wherein a wait time for execution of a following instruction caused during the switching operation of a bank in the register banks can be reduced.

2. Description of the Prior Art

Conventionally, in a conventional microprocessor having a register bank architecture, a built-in RAM 126 and general-purpose register group 127 are connected through a exclusive high-speed bus 128 in order to that the contents of the general-purpose register group 127 are agreed with the contents of the built-in RAM 126. In the conventional microprocessor, contents of the general-purpose register group 127 are stored and loaded to/from the RAM 126 by setting a destination part of a normal instruction with a current bank pointer (CBP). In addition, when a task change operation is performed, the data in the general registers are automatically stored and loaded through the exclusive high speed bus 128.

FIG. 1 is a configuration diagram of a conventional single-chip microprocessor 100 having a register bank architecture. FIG. 2 is a configuration diagram of a CPU core formed in this single-chip microprocessor 100 shown in FIG. 1.

As illustrated in FIG. 1, a microprocessor 100 comprises a plurality of blocks such as a CPU core 101, the built-in RAM 126, the built-in ROM 105, a bus controller 107, an interrupt controller 109, a timer 111, and a serial I/O 113, and the like mounted on one chip. These blocks transfer data through a system bus SYSBUS (containing an address bus ABUS and a data bus DBUS) in the chip. In addition, data transmission between the chip and external devices is performed through I/O pads in the chip under the control of the bus controller 107.

As illustrated in FIG. 2, this conventional technology there is the RAM 126 making up a RAM such as a Static Random Access Memory (SRAM) and the general-purpose register group 127 comprises a plurality of register banks in the CPU core 101. The RAM 126 is connected to the internal bus including IDBUS1 to IDBUS3 in the CPU core 101. Data is transferred through the internal bus of IDBUS1 to IDBUS3 to an ALU 125 (Arithmetic Logic Unit) where operations are performed.

FIG. 3 is a general configuration diagram of explaining a conventional register bank architecture in the general-purpose register group 127 builded-in the conventional microprocessor core 101 shown in FIG. 2. FIG. 4 is a configuration diagram of a conventional bank control unit BCU. FIG. 5 is a timing chart for explaining a bank switching operation in the register banks in the general-purpose registers 126.

An instruction decoder 121 decodes an instruction word transmitted from a bus interface unit (omitted from FIG. 2), reads out a microcode, and generates a control signal for controlling each block. When the microcode which provides destination operand data indicates a Current Bank Pointer (CBP), a Current Bank Pointer accumulation Control signal (CBPC) is switched to an enable level (to a High Level shown in FIG. 5). The bank control unit BCU which has received the current bank pointer accumulation control signal CBPC generates a bank stop signal STOP to each block in order to inform that the register banks 127 is now used, so that the blocks which have received the stop signal STOP do not process the next instruction.

For example, as shown in FIG. 3, in the general-purpose register group 127 (R0 to R15) made up of sixteen 16-bit registers, these registers are groped into four register banks RF1 to RF4 in which the general-purpose registers R0 to R3 are grouped as first register bank RF1, the general-purpose registers R4 to R7 as second register bank RF2, the general-purpose registers R8 to R11 as third register bank RF3, and the general-purpose registers R12 to R15 as fourth register bank RF4. In this case, data is transferred between the general-purpose register group 127 and the built-in RAM 126 per register bank at a time through the high-speed 64-bit bus 128.

The store/load operations for the general-purpose register group 127 (R0 to R15) will now be explained with reference to the timing chart shown in FIG. 5.

Data in the general-purpose register group (GR) 127 from the first register bank RF1 to the fourth register bank RF4 is transmitted in sequence to the region of the 8-byte in the built-in RAM 126 from an address indicated by the current bank pointer CBP because one bank has 8 bytes (hereinafter abbreviated to cbp×8).

A register address REGA transmitted from the Bank control Unit BCU to the general-purpose register group 127 is designated by four bits corresponds to a register number, for example, the number "0" in the register R0. The time for one clock signal is required to transfer one bank between the general-purpose register group 127 and the RAM 126.

The contents of each of the first register bank RF1, the second register bank RF2, the third register bank RF3, and the fourth register bank RF4 are transmitted to the regions in the built-in RAM 126, the regions are addressed by cbp× 8bytes, (cbp+1)×8 bytes, (cbp+2)×8 bytes, and (cbp+3)×8 bytes, respectively.

The bank control unit BCU receives a current bank pointer write-in request signal CBPW during the cycle in which the transmission from the general-purpose register group 127 to the built-in RAM 126 completes, and data designating a new current bank pointer is transmitted to the current bank pointer CBP from a data register (omitted from FIG. 3) through a internal bus IBUS.

In the next cycle, the contents of an 8-byte (cbp'×8) RAM region are transmitted to the first register bank RF1 from an address cbp' in the RAM 126 indicated by the current bank pointer CBP.

Transmission is performed in the same manner for the second register bank RF2 to the fourth register bank RF4. Then, the bank stop signal STOP is disabled and the transmission termination is communicated to each block simultaneously in the transmission cycle for the fourth register bank RF4.

Specifically, the execution of the instruction is in a standby state for at least eight clock signals required for transmission during bank switching, regulated by the bank stop signal STOP.

As outlined in the foregoing description, with a conventional microprocessor, the number of general-purpose registers or register banks stored and loaded is fixed, and a method is adopted whereby all of the register banks RF1 to RF4 in the general-purpose register group 127 are transferred to/from the build-in RAM 126 in one transmission operation. Therefore the number of clock cycles required for storing and loading the contents of the general-purpose register group 127 is determined by the number of general-purpose registers and which is also determined by the bit width of the exclusive high-speed bus 128 through which the RAM 126 and the general-purpose register group 127 are connected.

However, when four general-purpose registers make up one bank and there are 16 general-purpose registers, eight clock cycles must be required, for example, merely for storing and loading for all of the register banks RF1 to RF4.

Because the execution of the next instruction must wait during this interval, there is the problem that the efficiency of execution of the instructions drops.

SUMMARY OF THE INVENTION

Accordingly, an object of the present invention is, with due consideration to the drawbacks of such conventional microprocessors, to provide a microprocessor wherein the time for switching register banks and the waiting time for executing the next instruction are reduced because only a specified bank size portion is stored and loaded.

In accordance with one aspect of the present invention, there is provided a microprocessor having a register bank architecture for executing instructions, comprising:

register bank means comprising n register banks (where n is a positive integer), each of said n register banks comprising a plurality of general-purpose registers;

memory means for storing data of said register bank means;

bus means for connecting said register bank means and said memory means; and bank control means for controlling a data store operation for storing data in said register bank means to said memory means and for controlling a data load operation for loading data in said memory means to said register bank means, said bank control means comprises:

a current bank pointer for storing address data indicating data region in said memory means when the data store operation and the data load operation being executed; and a bank size designation register for storing bank size data indicating a bank size to be stored and to be loaded during the data store operation and the data load operation, wherein when an address of said current bank pointer is set in an destination operand in said instruction, said bank control means receives the content of said current bank pointer and the content of said bank size designation register, and said bank control means controls said data store operation for said n register banks designated by the contents of said current bank pointer and said bank size designation register, and said bank control means changes the content of said current bank pointer with the content of the destination operand in said instruction after the completion of said data store operation, and said bank control means receives the content of said current bank pointer and the content of said bank size designation register, and said bank control means controls said data load operation for said memory means by the contents of said current bank pointer and said bank size designation register.

The microprocessor described above further comprises:

n load completion flags (where n is an positive integer) provided to each of said n register banks for indicating that said data load operation has been completed in each of said n register banks, wherein after the data store operation is completed, following instructions in said instructions are executed by said microprocessor, said data load operation is executed simultaneously, and said bank control means sets said n load completion flag only for said n register banks for which said data load operation have been completed, the instruction in said following instructions uses said n register banks is commenced only after the n load completion flags are set.

The microprocessor described above, further comprises:

n reference flags (n is an positive integer) provided to each of said n register banks for indicating that said n register banks being referenced by said following instructions after said data store operation and said data load operation being completed, wherein said bank control means sets said n reference flags after said data store operation and said data load operation have been completed, said microprocessor restarts the execution of said following instructions, and said bank control means controls said data load operation for said n register banks only for said reference flags have been set.

The microprocessor described above further comprises: n rewrite flags (n is a positive integer) provided to each of said n register banks for indicating that the contents of said n register banks have been rewritten, wherein said bank control means controls said data store operation for said n register banks only for said n rewrite flags have been set.

The microprocessor described above further comprises:

a first bank size designation register for designating the bank size of said n register banks for said data store operation; and a second bank size designation register for designating the bank size of said n register banks for said data load operation, wherein said bank control means receives the content of said first bank size designation register and controls said data store operation only for said n register banks designated by the content of said first bank size designation register, and said bank control means receives the content of said second bank size designation register and controls said data load operation only for said n register banks designated by the content of said second bank size designation register.

In the microprocessor described above, said instructions include a special instruction, the address of said current bank size pointer, and the address of said bank size designation register or the address of said second bank size designation register are set in an operand part in said special instruction.

The microprocessor described above further comprises: a precurrent bank pointer latch whose address is set in the destination in said instructions, wherein said bank control means receives a content of said current bank pointer and controls said data store operation for said register banks designated by the content of said current bank pointer, and said bank control means receives a content of said precurrent bank pointer latch and controls said data load operation for said memory means designated by the content of said precurrent bank pointer latch.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
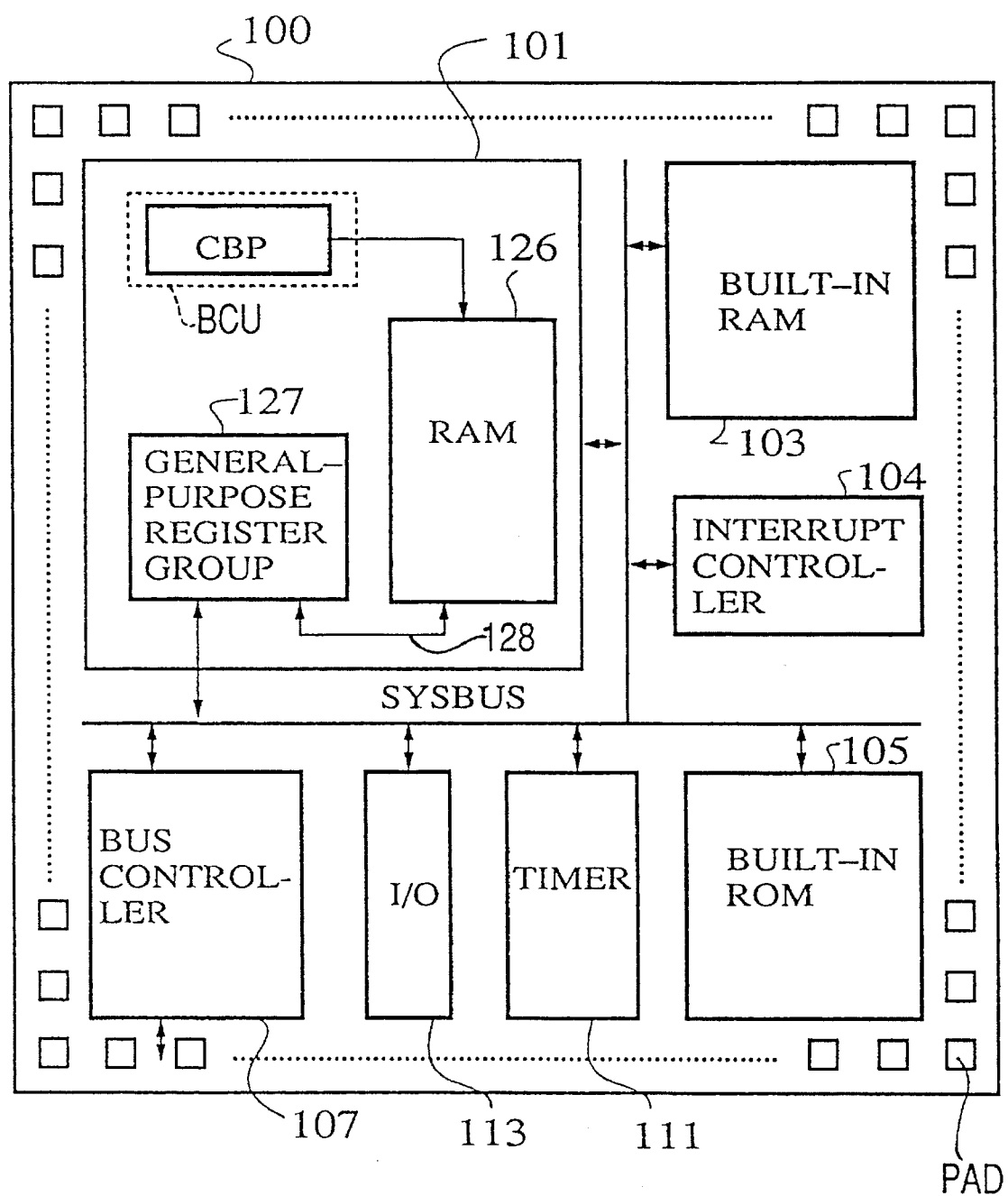
FIG. 1 is a configuration diagram of a conventional single-chip microprocesor having a conventional register bank architecture.
Figure 2:
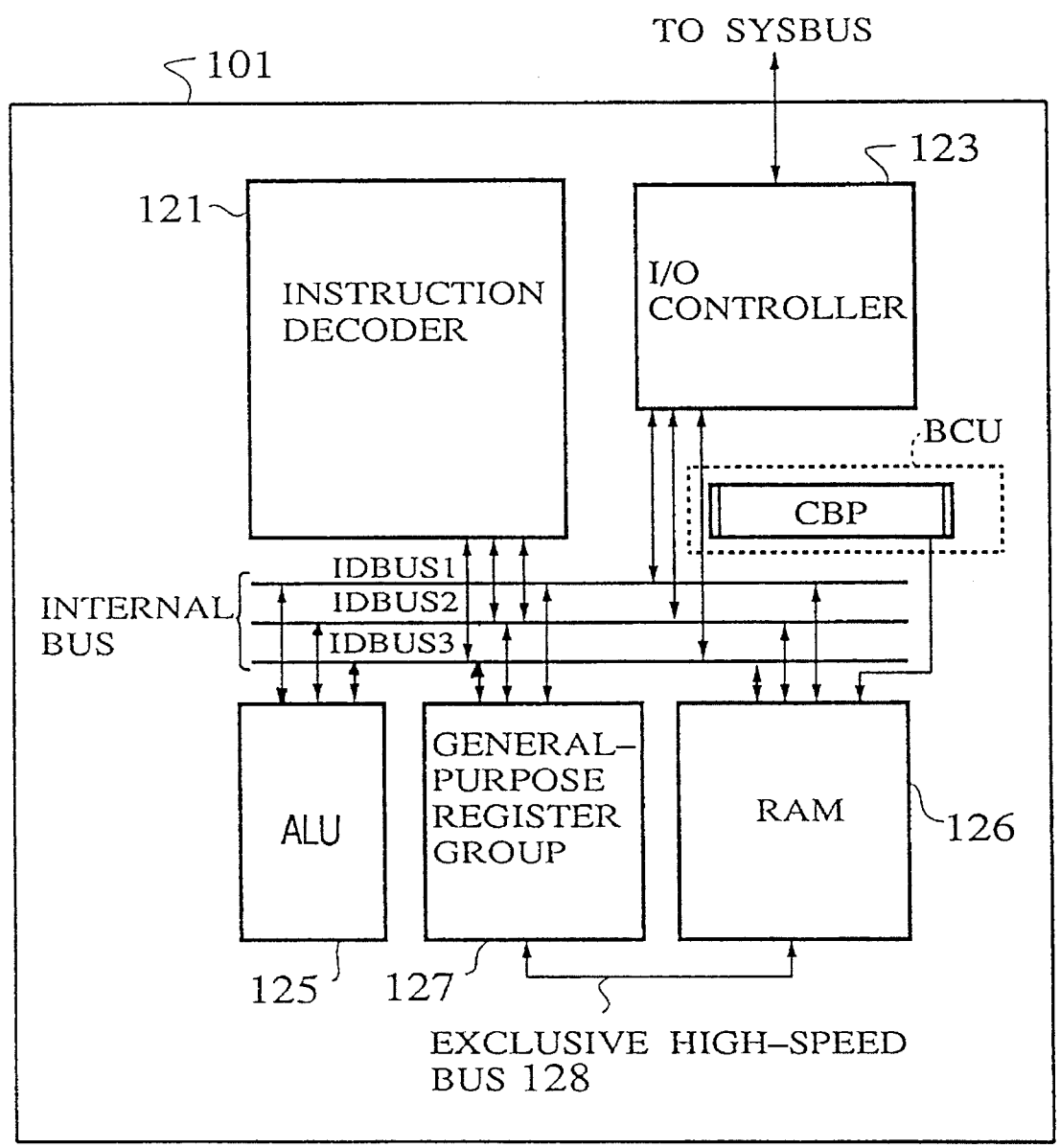
FIG. 2 is a configuration diagram of a CPU core mounted on the single-chip microprocessor shown in FIG. 1.
Figure 3:
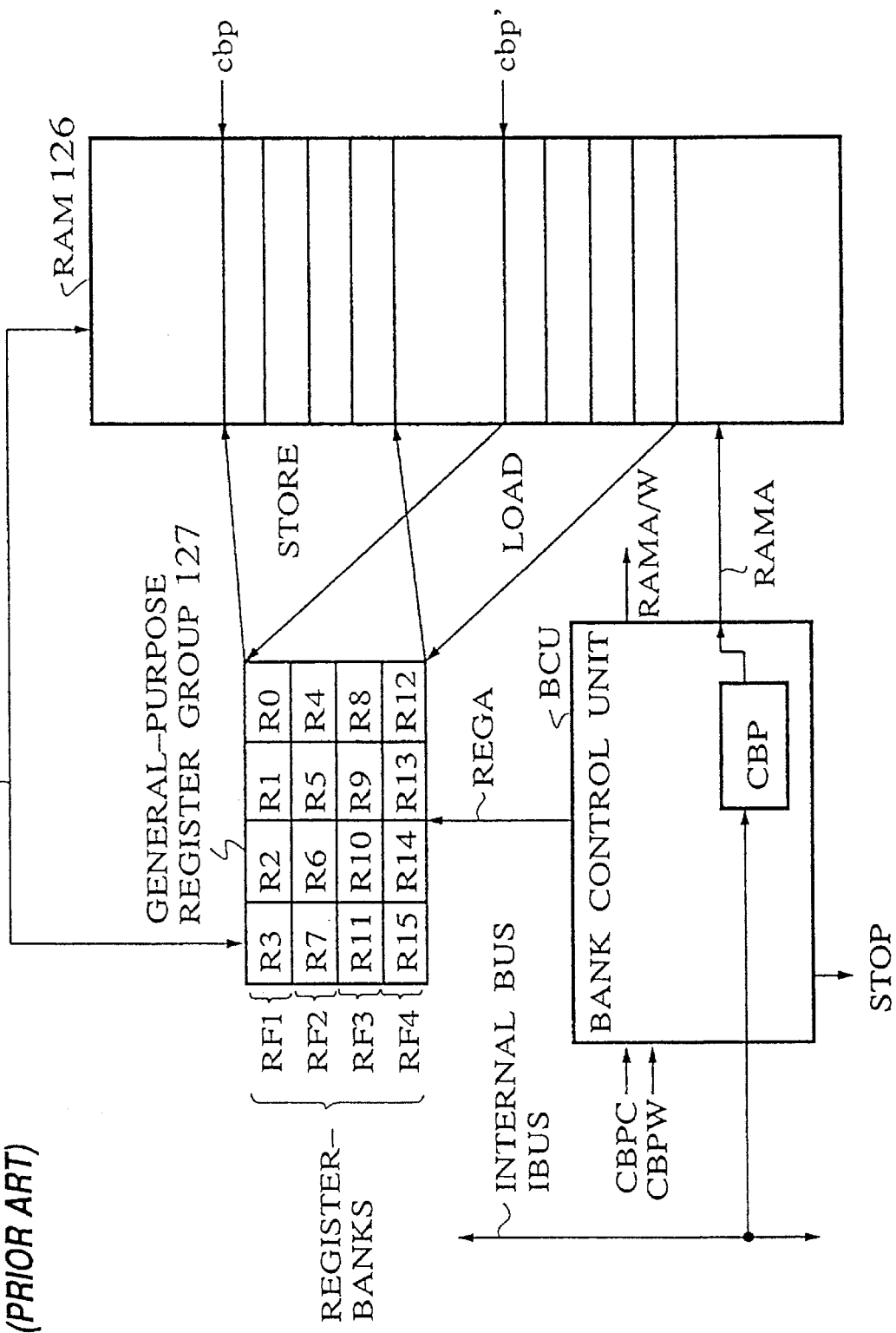
FIG. 3 is a configuration diagram of a general-purpose register group, a RAM, and a bank control unit in the conventional microprocessor shown in FIG. 1.
Figure 4:
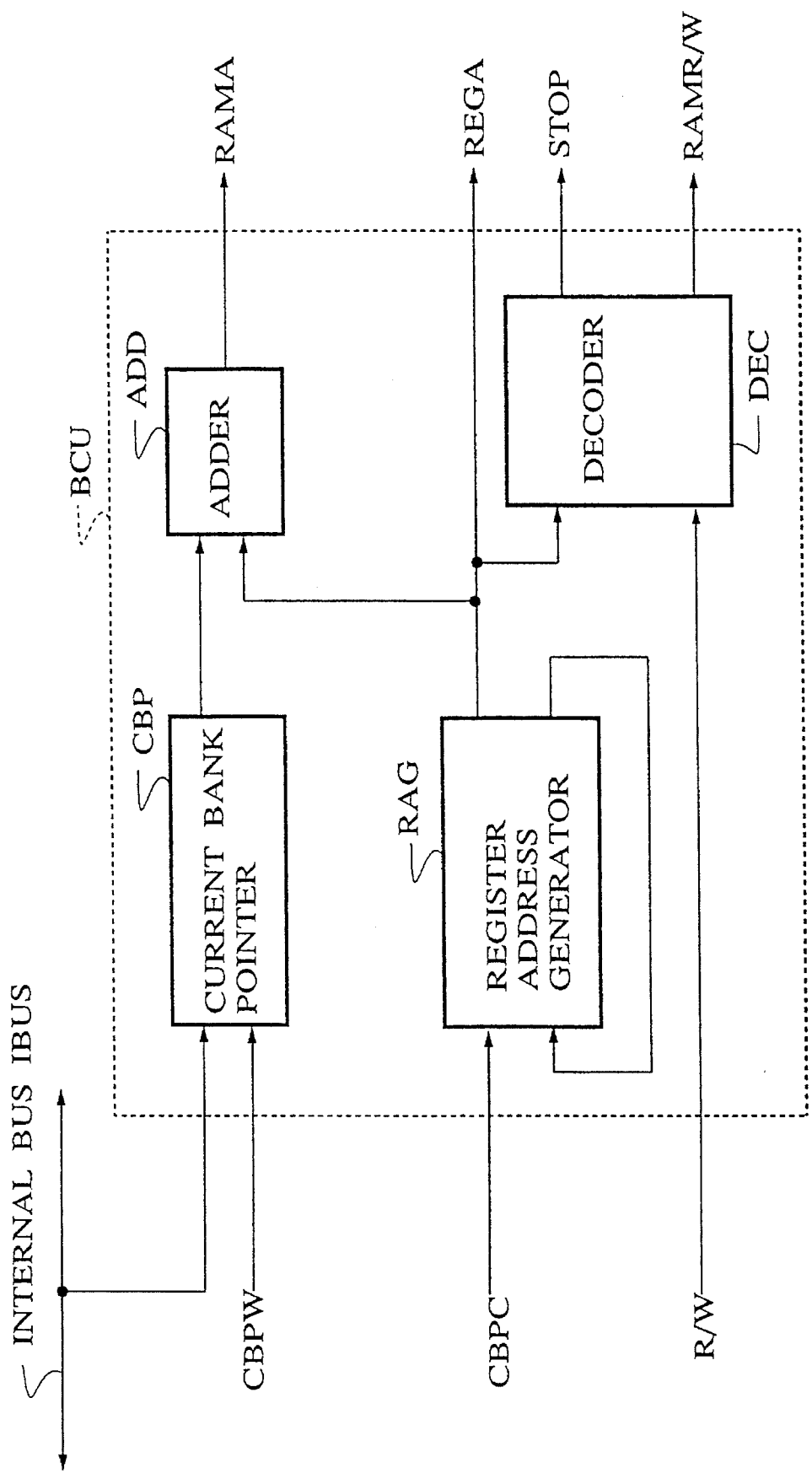
FIG. 4 is a configuration diagram of a conventional bank control unit BCU in the microprocessor shown in FIG. 1.
Figure 5:
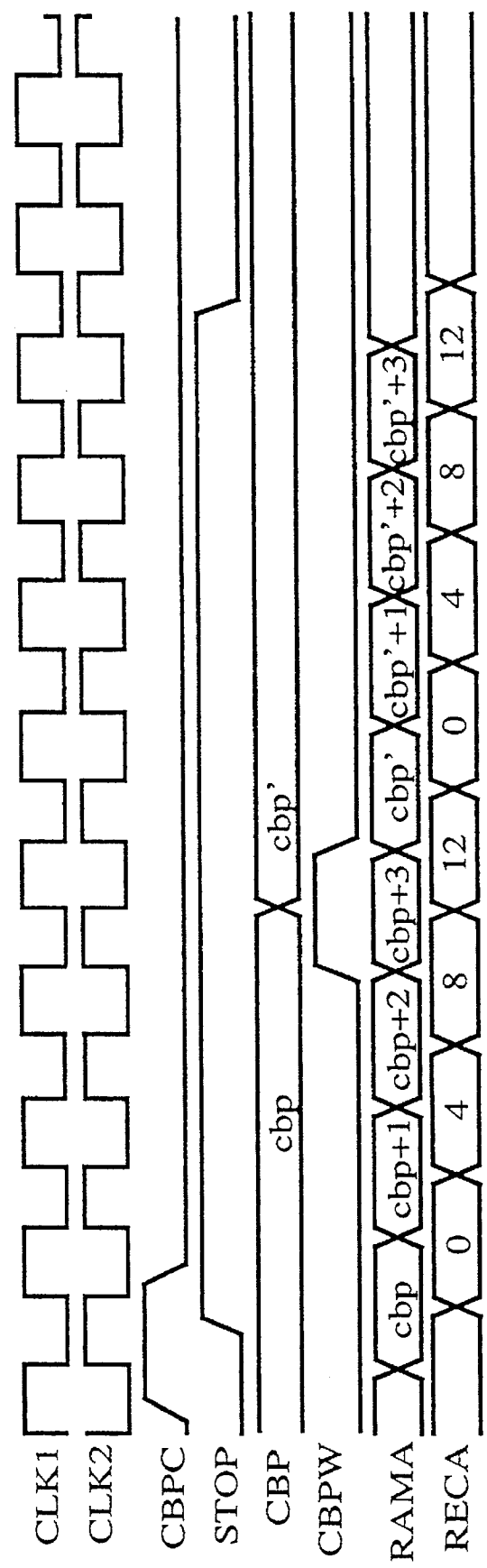
FIG. 5 is a timing chart for explaining store/load operations for register banks based on the conventional register bank architecture in the microprocesor shown in FIG. 1.

Other features of this invention will become apparent in the course of the following description of exemplary embodiments which are given for illustration of the invention and are not intended to be limiting thereof. Embodiments of the present invention will now be explained i-th reference to the drawings.

Basic conception of the Present Invention

First concept

In a microprocessor having a register bank architecture as a first concept of the present invention, when a current bank pointer CBP is designated by using a destination operand in an instruction, only the contents of register banks RF1 to RF4 designated by a bank size in a bank size designation register BS are stored/loaded to/from a built-in RAM, based on the content of the current bank pointer CBP at that time. Then, the content of the current bank pointer CBP is rewritten with cbp', based on the specified instruction, and only the data for the bank size portion specified by the bank size specification register BS is loaded to the register banks RF1 to RF4 from the built-in RAM 103 based on the content cbp' of the current bank pointer CBP after this rewrite. In this manner, with the microprocessor of the present invention, because only the contents of the register banks specified by the bank size designation register BS are stored/loaded, there is no storing and loading for unnecessary register banks, as with a conventional microprocessor, so that it is possible to reduce the waiting time for executing the next instruction when the bank is switched.

Second concept

In addition, in the microprocessor as a second concept of the present invention, a store operation to the RAM is commenced after the completion of a load operation from the RAM, simultaneously with the re-execution of the next specified instruction, and store completion flags, BF1 to BF4 are set for the register banks in which the store operation has been completed.

In subsequent instructions, only instruction for accessing the register banks RF1 to RF4 is executed based on the store completion flags BF1 to BF4. Therefore it is possible to further reduce the waiting time for executing the next instruction.

Third concept

In the microprocessor of the present invention, the subsequent instructions are continued after the completion of the store operation. Reference flags BR1 to BR4 are set, corresponding to the register bank accessed by the subsequent instruction execution operation, and the load operation is carried out only for the register bank in which a reference flag is set. Therefore wasteful rewrite operations can be eliminated and the instructions can be executed at high speed.

Fourth concept

Also, in the microprocessor of the present invention, a store operation is carried out for only the register banks for which rewrite flags BK1 to BK4 are set, therefore wasteful rewrite operations can be eliminated and the instructions can be executed at high speed.

Fifth concept

Also, in the microprocessor of the present invention, a destination part in a specified instruction designates a current bank pointer CBP and a bank size designation register BS or a second bank size designation register BS2 and bank pointer CBP, and only stores the register banks designated by the bank size designation register BS or a first bank size designation register BS1 to the RAM. Only the register banks designated by the bank size designation register BS or the second bank size designation register BS2 are loaded. Therefore, because store/load is not performed for unused register banks, as with conventional microprocessors, it is possible to reduce the waiting time for executing the next instruction when the bank is switched.

In addition, in the microprocessor of the present invention, a precurrent bank pointer latch PCBP is designated by a destination part in the specified instruction or in an exclusive instruction, and a store operation is carried out based on the contents of the current bank pointer CBP and the load operation is executed based on the contents of the precurrent bank pointer latch PCBP. Specifically, only the register banks designated by the content of the bank size designation register BS, and only the register banks designated by the content of the operand in the special instruction is loaded so that it is possible to reduce the waiting time for executing the next instruction when the register bank is switched.

Summarizing the above-mentioned contents of the basic concepts of the present invention, the data transfer operation only for the necessary number of register banks is performed between the general-purpose register group and the RAM when rewriting the current bank pointer CBP, so that a reduction in the number of data transmission clock cycles is realized so that it is possible to reduce the waiting time for executing the next instruction. For example, with the conventional technology, ten clock cycles were necessary for a register file containing data of four register banks, but with the present invention, the rewrite of the current bank pointer CBP is completed in four clock cycles when only one bank is used.

Also, by permitting an instruction execution, it is possible to quickly execute the next instruction in the time for a data load operation from the built-in RAM to the general-purpose register group. In the case where register access is not occurred in the data loading period for the next instruction, great efficiency can be expected by using frequently the general-purpose registers.

Preferred embodiments of the present invention will now be described below.

First Embodiment

Figure 6:
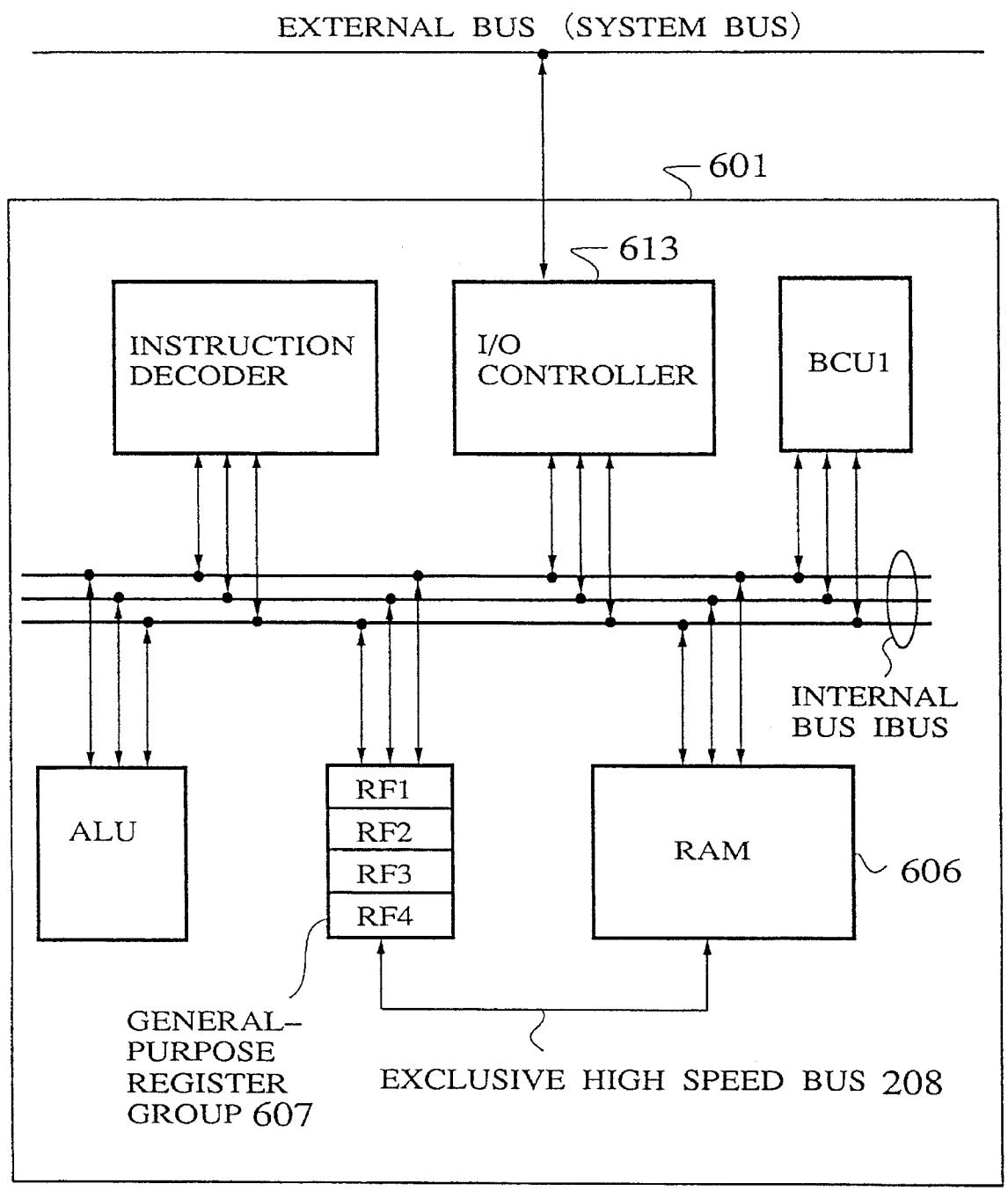
FIG. 6 is a general configuration diagram of a microprocessor core in a microprocesor as a first embodiment of the present invention.

FIG. 6 is a general configuration diagram of a microprocessor core 601 of a microprocessor as a first embodiment of the present invention. In FIG. 6, the microprocessor core 601 comprises an instruction decoder, a I/O controller 613, a bank control unit BCU1, an arithmetic and logic unit (ALU), a general-purpose register group including four register banks RF1 to RF4, each register bank having a predetermined number of general-purpose registers, and a build-in RAM 606.

Figure 7:
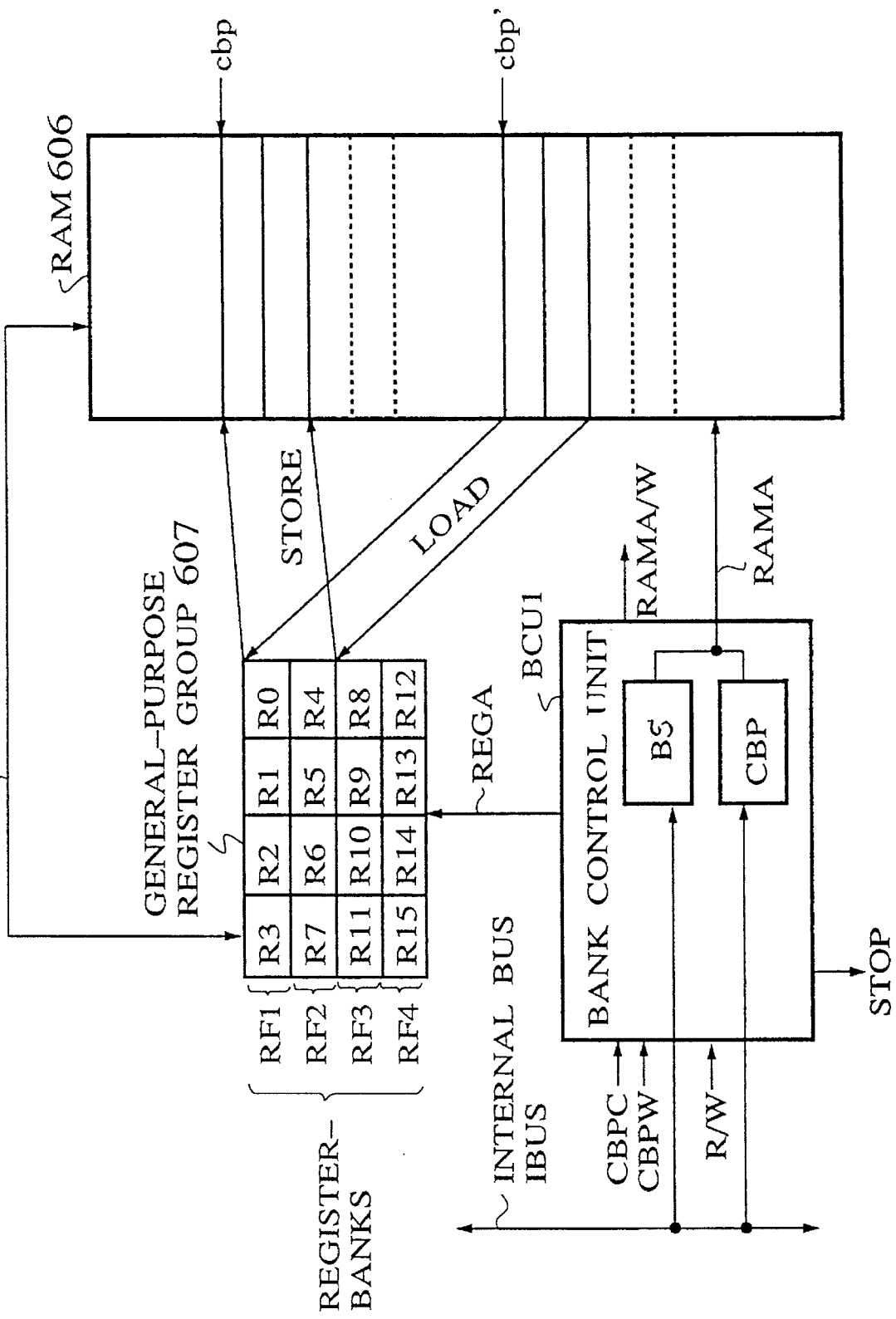
FIG. 7 is a connection relationship among a general-purpose registers, a build-in RAM, and a bank control unit BCU1 as components in the microprocessor core shown in FIG. 6.

FIG. 7 is a general configuration diagram of the connection relationship among the general-purpose register group 607, the built-in RAM 606, and the bank control unit BCU1 in the microprocessor core 601, as shown in FIG. 6, as the first embodiment of the present invention.

In FIG. 6, the microprocessor core 601 in the microprocessor of the present embodiment includes the register banks RF1 to RF4 (n=4), each of the register banks made up of four general-purpose registers R0 to R3, R4 to R7, R8 to R11, or R12 to R15 respectively. The register banks RF1 to RF4 are connected to the RAM 606 through an exclusive high speed bus 608. The bank control unit BCU1 controls a bank switching operation for storing the contents of the register banks RF1 to Rf4 to the RAM 606 and for loading the contents of the RAM 606 to the register banks RF1 to RF4.

The bank control unit BCU1 controls the use of internal bus, generates addresses for the general-purpose register group (R0 to R15) and the built-in RAM 606, generates control signals for each block as the components of the microprocessor core 601, and controls the bank control unit BCU1 itself.

Figure 8:
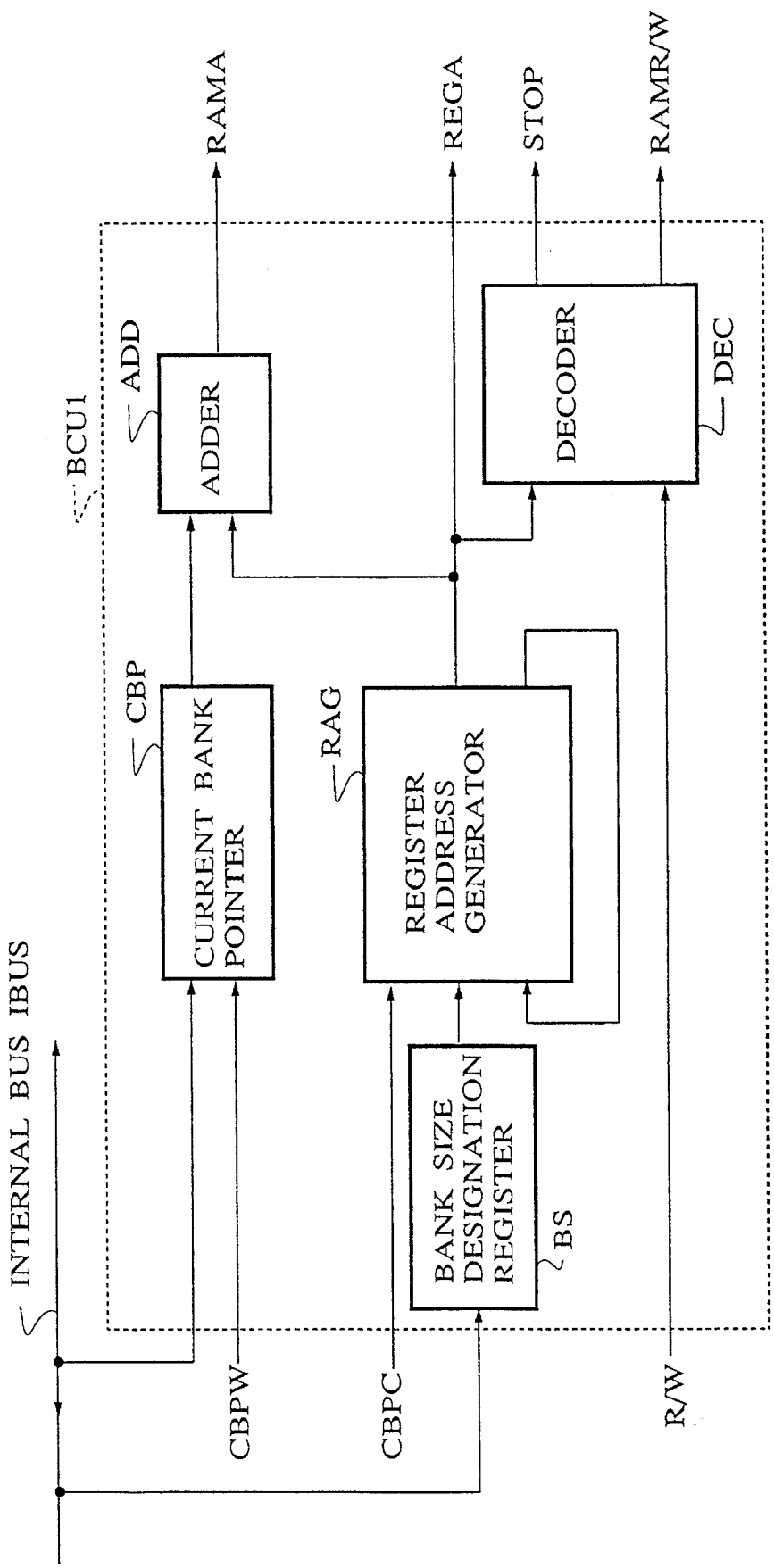
FIG. 8 is a configuration diagram of the bank control unit BCU1.

The bank control unit BCU1, as shown in FIG. 8, comprises a current bank pointer CBP, a bank size designation register BS, a register address generating section or a register address generator RAG, an adder ADD, and a decoder DEC.

The current bank pointer CBP receives address data through the internal bus IBUS and then stores the received address data. The received address data include information for indicating the address data relating to regions in the RAM 606 to which the contents of the register banks RF1 to RF4 are stored, or have information for indicating the address data relating to regions in the RAM 606 from which the contents of the region in RAM 606 are loaded to the register banks RF1 to RF4. In addition, the bank size designation register BS designates the bank size (which is the number of the register banks to be stored to the RAM 606 or to be loaded from the RAM 606) during the above-mentioned store and load operations.

The register address generator RAG has a state machine which indicates which register bank is a target register banks in the current store and load operations. The decoder DEC decodes outputs from the state or the bank switching signal CBPC and the bank size designation register BS and then generates various control signals.

In the address generation, the register address generator RAG generates an address RAMA for the built-in RAM 606 to be loaded, and an address REGA for the head register in a register bank in the general-purpose register group 607 to be stored. In other words, specifically, the register address REGA having the smallest register number in the bank register to be stored in the load operation to the register banks.

The state machine incorporated in the register address generator RAG has a circuit determining the upper limit address of the register address REGA and the built-in RAM 606 based on the contents of the bank size register BS.

Figure 9:
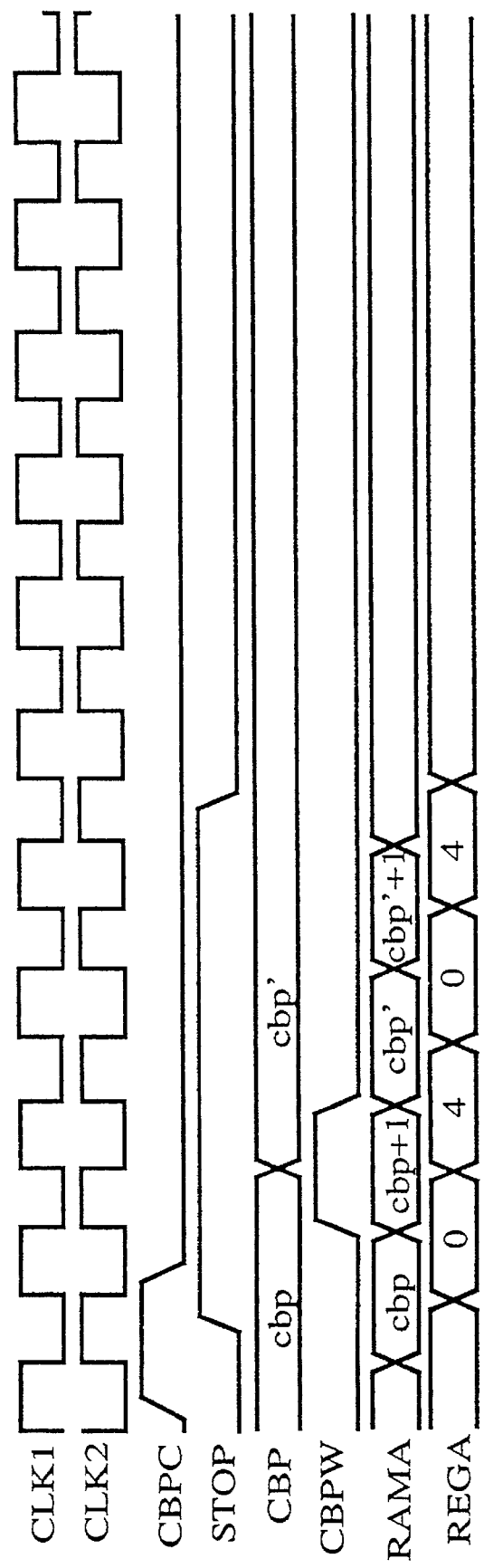
FIG. 9 is a timing chart for explaining the operation of the microprocessor core as the first embodiment of the present invention shown in FIG. 6.

Next, the operation of the microprocessor having a register bank architecture of the present embodiment will be explained with reference to the timing chart of FIG. 9.

The following explanation will be given for a bank size bs=2 designated by the bank size designation register BS.

First, when the current bank pointer CBP is designated as the destination operand in a specified instruction in a instruction set of the microprocessor, the contents of the register banks RF1 and RF2 corresponding to the bank size bs designated by the bank size designation register BS in the bank register are stored into the built-in RAM 606, based on the content cbp of the current bank pointer CBP at that time.

Next, the content of the current bank pointer CBP is rewritten as cbp' set in the destination operand of the specified instruction. The data relating to the bank size bs specified by the bank size specification register BS is loaded from the RAM 606 to the register banks (the first bank RF1 and the second bank RF2) based on the content cbp' of the current bank pointer CBP after the rewrite.

In this manner, in the microprocessor of the present embodiment, because only data in the register banks or the RAM 606 designated by the bank size in the bank size designation register BS is stored/loaded, the store/load operations are not performed for unused register banks as is done conventionally, so that it is possible to reduce the waiting time for executing the next instruction when the bank is switched.

Second Embodiment

Figure 10:
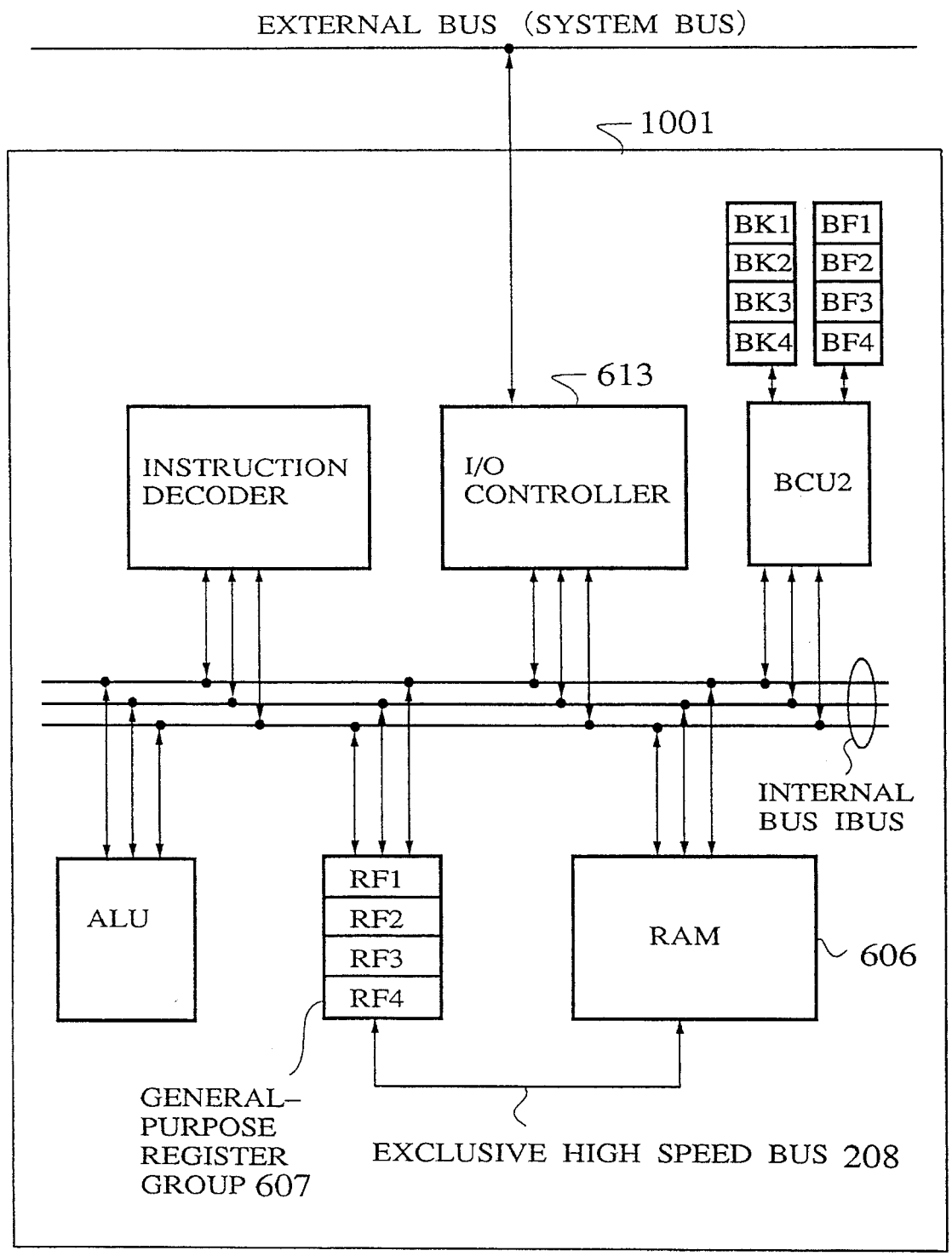
FIG. 10 is a general configuration diagram of a microprocessor core in a microprocessor as a second embodiment of the present invention.
Figure 11:
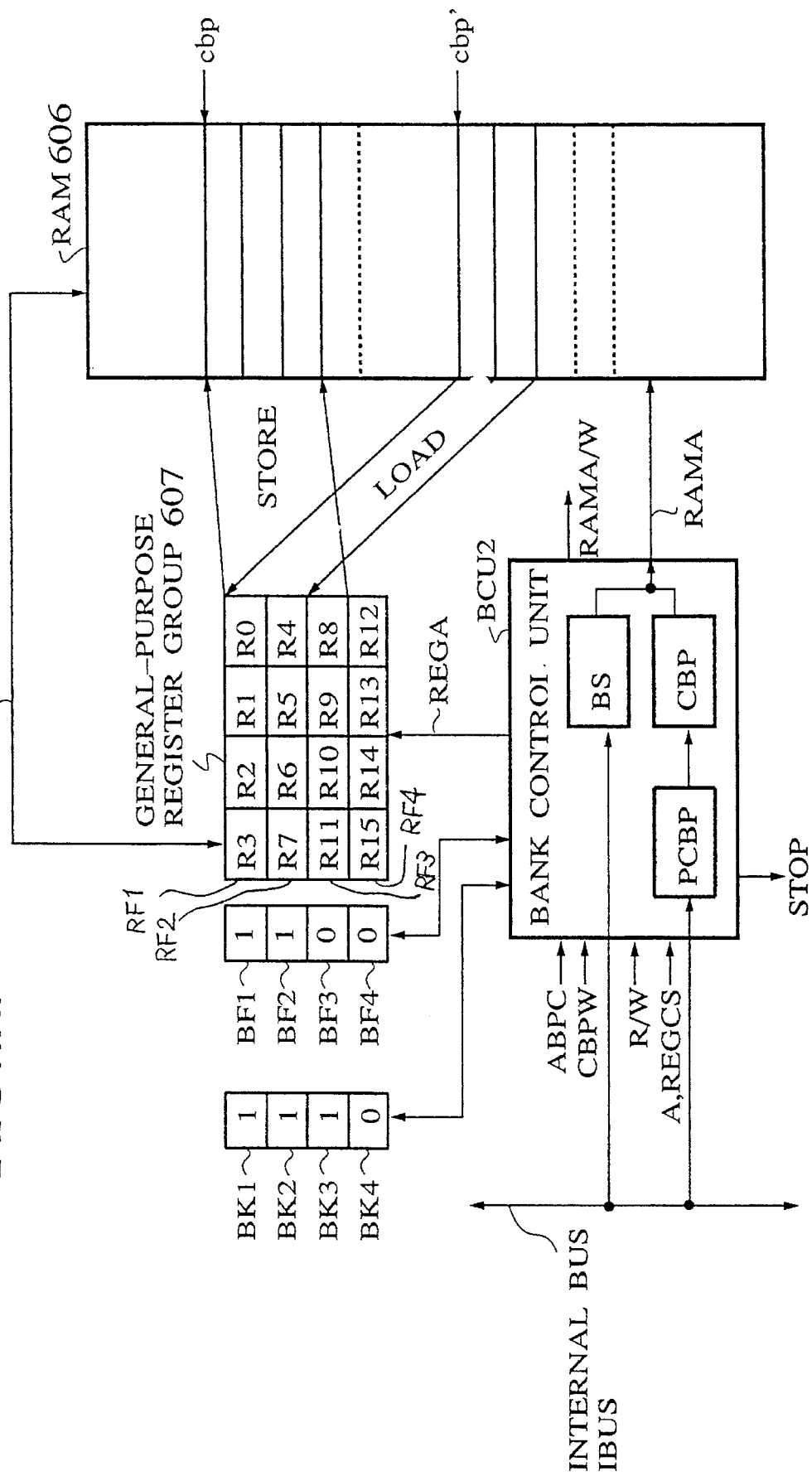
FIG. 11 is a connection relationship among a general-purpose registers, a build-in RAM, and a bank control unit BCU2 as components in the microprocessor core shown in FIG. 10.

FIG. 10 is a general configuration diagram of a microprocessor core 1001 in a microprocessor as a second embodiment of the present invention. FIG. 11 is a general configuration diagram showing the connection relationship among the general-purpose register group 607, the RAM 606, a bank control unit BCU2, and various flags BK1 to BK4 and BF1 to BF4. In FIG. 11, the microprocessor core 1001 of the present embodiment comprises the register banks RF1 to RF4, the exclusive high speed bus 608, load completion flags BF1 to BF4, store rewrite flags BK1 to BK4, and a bank control unit BCU2.

The load completion flags BF1 to BF4 are provided to the register banks RF1 to RF4, respectively, for indicating the completion of the load operation at each register bank. Also, the rewrite flags BK1 to BK4 are also provided to each register bank for indicating the completion of the rewrite of the contents of the register banks RF1 to RF4.

The bank control unit BCU2 controls the use of the internal bus IBUS, generates addresses for designating the general-purpose register group 607 including the registers R0 to R15 and the built-in RAM 606, for generating control signals for components or blocks in the microprocessor core 1001, and controls the bank control unit BCU2 itself.

Figure 12:
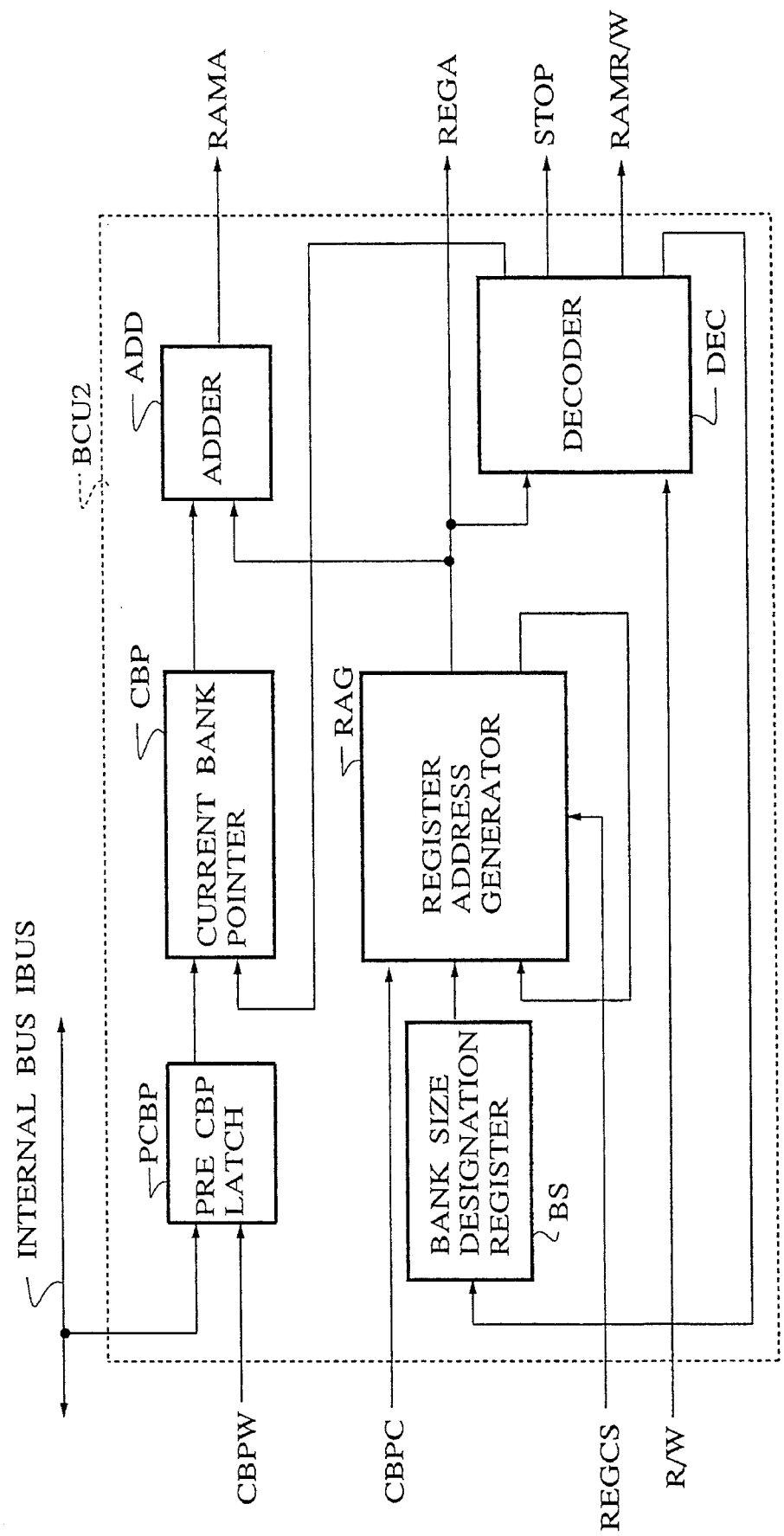
FIG. 12 is a configuration diagram of the bank control unit BCU2.

The bank control unit BCU2, as shown in FIG. 12, comprises a precurrent bank pointer latch PCBP, a current bank pointer CBP, a bank size designation register BS, a register address generator RAG, an adder ADD, and a decoder DEC.

The precurrent bank pointer latch PCBP is designated by the destination in the specified instruction and stores address data cbp' for all regions stored when loading data in the built-in RAM 606 to the register banks RF1 to RF4 via the internal bus IBUS.

The current bank pointer CBP stores address data cbp for storing data from the register banks RF1 to RF4 to the build-in RAM 606.

The bank size designation register BS designates a bank size stored or loaded during the above-mentioned store and load operations.

The register address generator RAG and the decoder DEC are the same as in the first embodiment shown in FIG. 8.

Figure 13:
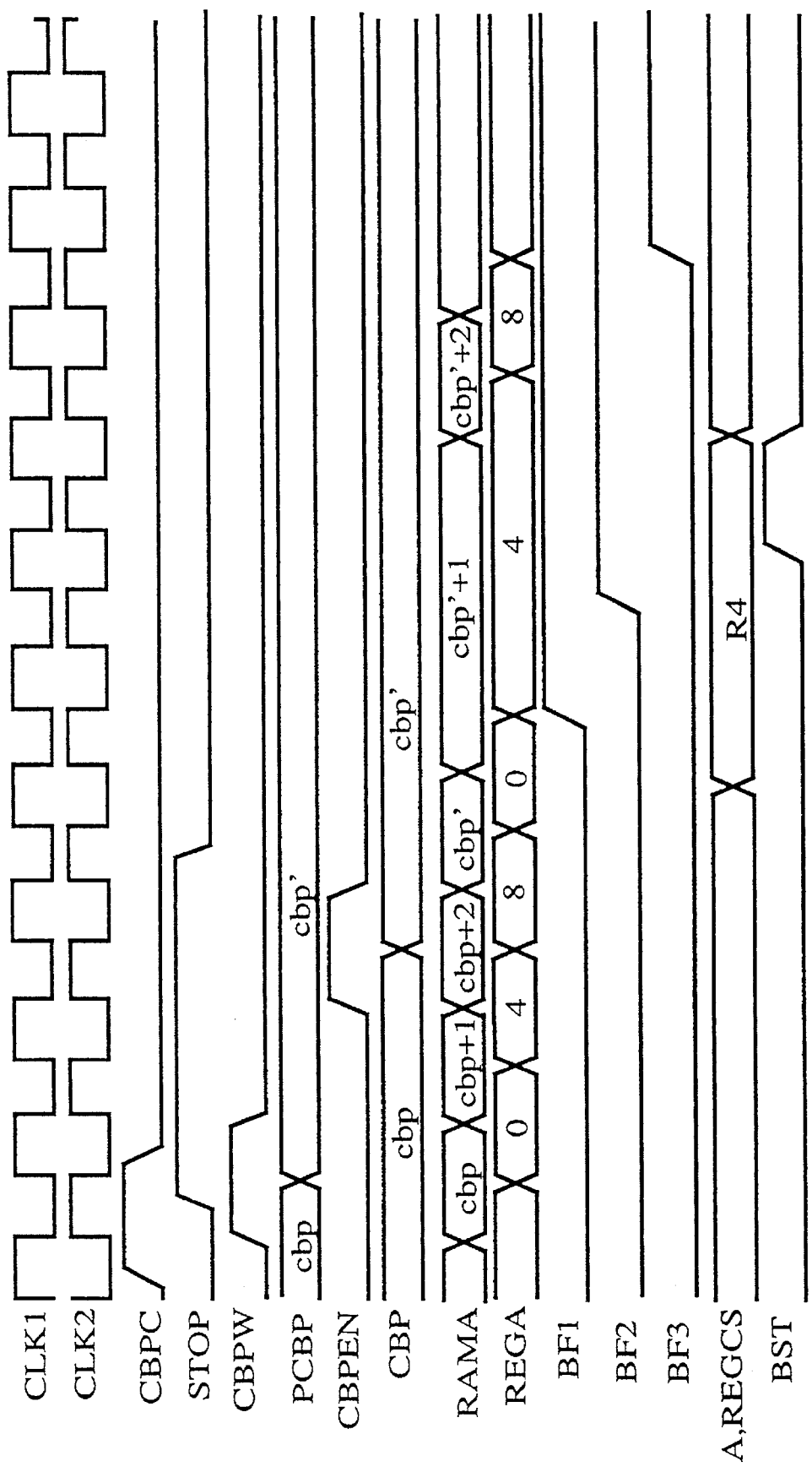
FIG. 13 is a timing chart for explaining the operation of the microprocessor core as the second embodiment of the present invention shown in FIG. 10.

Next, the read and load operations of the second embodiment will be explained with reference to the timing chart of FIG. 13. The following explanation will be given for a bank size bs=3 designated by the bank size designation register BS.

First, when the current bank pointer CBP is set in the destination operand in the specified instruction, the register banks RF1, RF2, and RF3 designated by a bank size bs (bs=3), which is the content of the bank size designation register BS, are stored to the build-in RAM 606.

This will now be explained in more detail. Specifically, when the bus control unit BCU2 receives a current bank pointer storage control signal CBPC, receives a CBP write signal CPBW from a bus interface unit, and a new current bank pointer value cbp' from the internal bus IBUS is latched by the precurrent bank pointer latch PCBP, simultaneous with the storing of the first bank RF1.

The decoder DEC transfers a bank stop signal STOP, which is information for halting the register bank access operation, in order to enter each component or block into an NOP (No Operation) state.

In a final cycle in which contents of a specified number of the register banks (n=3) are stored to the RAM 606 in accordance with the bank size designation register BS, a CBP rewrite enable signal CBPEN is transferred to the current bank pointer CBP, and the value cbp of the current bank pointer CBP is changed to the value cbp'.

This store operation is carried out only in the register banks, the rewrite flags BK1 to BK4 of which are set. Here, for easy understanding of the explanation, the rewrite flags BK1 to BK3 are set for all the register banks RF1 to RF3 in which data has been stored.

Next, the load operation will be explained. One of the features of the second embodiment is that after the load operation has been performed, the store operation is commenced and the load completion flags BF1 to BF4 are set for the register banks wherein the load operation has been completed simultaneously with the resumption of the execution of the instruction following the specified instruction. The instructions for accessing the register banks RF1 to RF4 in the subsequent instruction are carried out after the load completion flags for these register banks have been set. This is the special feature.

Specifically, when the store operation of the data in the general registers in the register banks to the build-in RAM 606 has been completed, the content of the current bank pointer CBP is rewritten with cbp', and the load operation is commenced from the built-in RAM 606 to the register banks under the control of the bank control unit BCU2.

The level of the bank stopper signal STOP is changed in order to stop the NOP indication simultaneous with the rewrite of the current bank pointer CBP. Access to the general-purpose registers is authorized by an instruction after the load completion flags BF1 to BF4 for indicating the completion of the load operation of the data from the built-in RAM 606 to the general registers are set.

Conversely, in the time period when the load completion flags BF1 to BF4 are not set, access to the general registers GR is not authorized and the instruction is in the stand-by state.

In the case of this embodiment (FIG. 13), it is seen that, after the change of the level of the bank stopper signal STOP, there is a write request to the general register R4, the load completion flag BF2 is changed to "1", and a bus start signal BST is transferred from the bus interface unit. Write-in to the general-purpose register R4 is then carried out by an instruction.

The rewrite flags BK1 to BK4 are reset when the load operation is completed. By executing the instruction for writing to the general-purpose register R4 the rewrite flag BK2 is set to "1".

In this manner, in the microprocessor of the second embodiment, like the first embodiment, only the register banks designated by the bank size in the bank size designation register BS are stored and loaded so that it is possible to reduce the waiting time for executing the next instruction when the register bank is switched.

In addition, the store operation is carried out only for the register banks relating to that the rewrite flags BK1 to BK4 are set, therefore wasteful rewrite operations can be eliminated and the instructions can be executed at high speed.

Furthermore, after the store operation, the load operation is commenced and the load completion flags BF1 to BF4 are set for the register banks which the load operation has been completed, simultaneously with the resumption of the execution of the next instruction. The instructions using the register banks RF1 to RF4 in the subsequent instructions are carried out after the load completion flags for the register banks have been set. It is therefore possible to reduce the waiting time for executing the next instruction.

Figure 14:
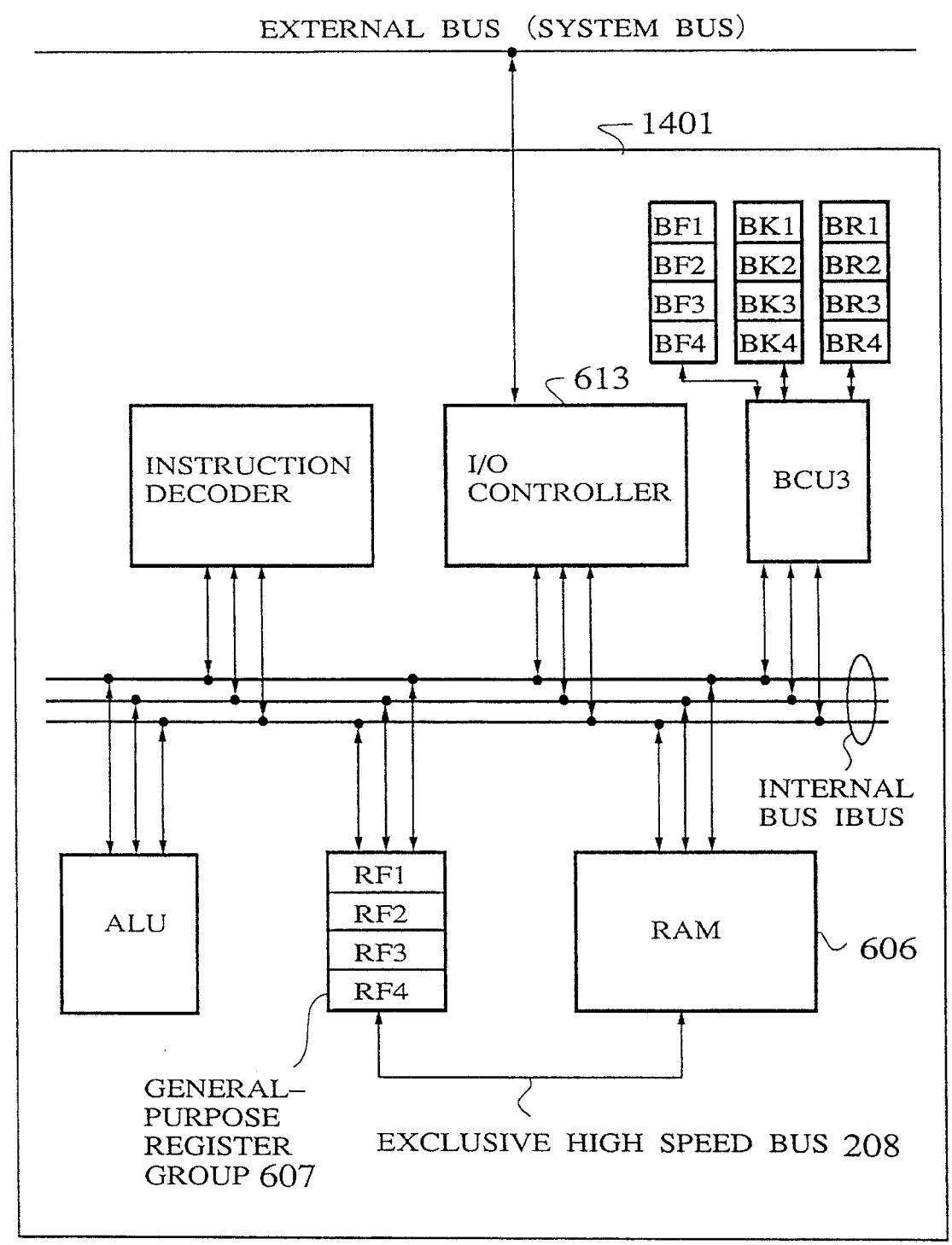
FIG. 14 is a general configuration diagram of a microprocessor core in a microprocessor as a third embodiment of the present invention.

FIG. 14 is a general configuration diagram of a microprocessor core 1401 in a microprocessor as a third embodiment of the present invention.

Figure 15:
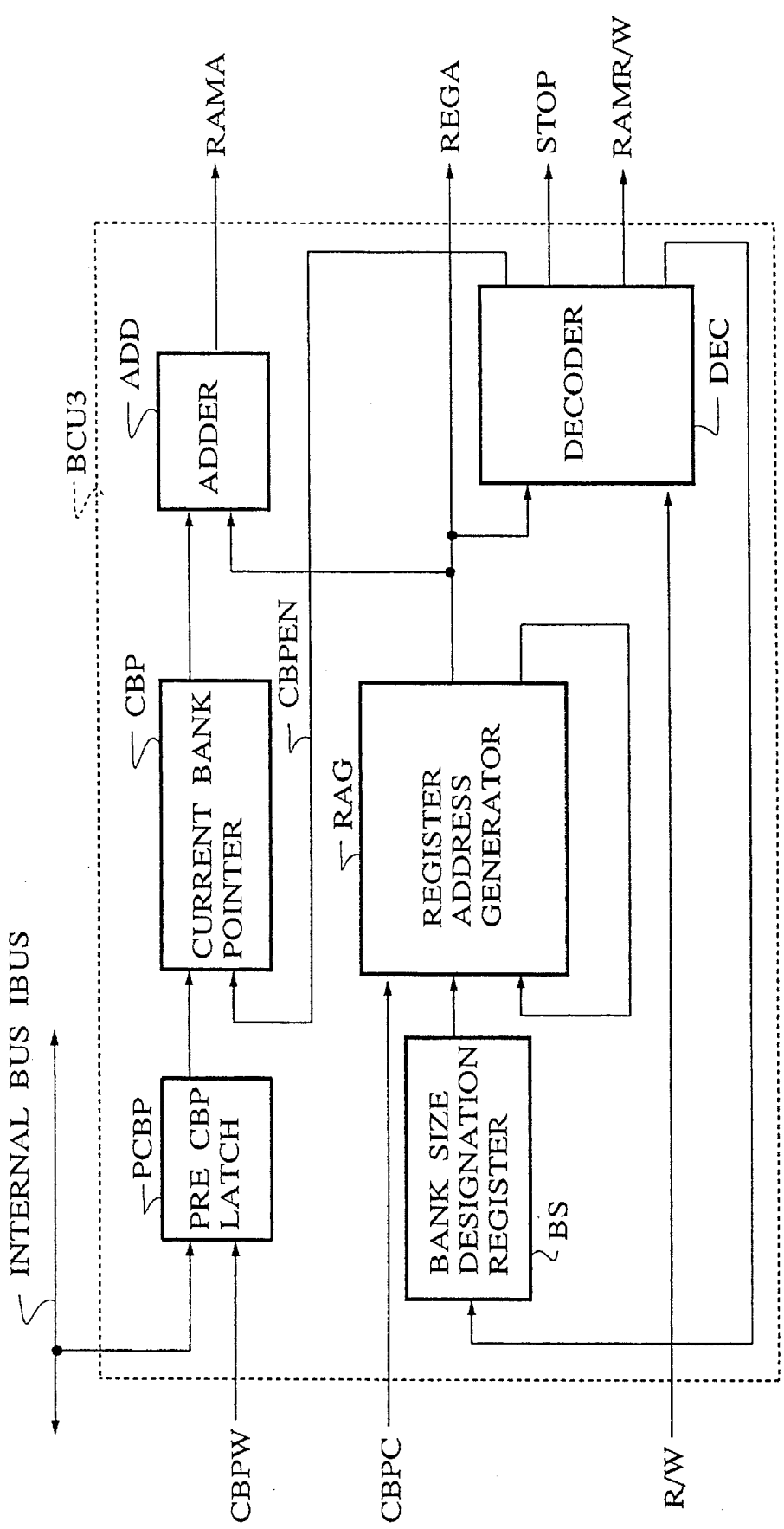
FIG. 15 is a connection relationship among a general-purpose registers, a build-in RAM, and a bank control unit BCU3 as components in the microprocessor core shown in FIG. 14.

FIG. 15 is a general configuration diagram of the bus control unit BCU3 incorporated in the microprocessor core 1401 shown in FIG. 14, a third embodiment of a microprocessor of the present invention.

Figure 16:
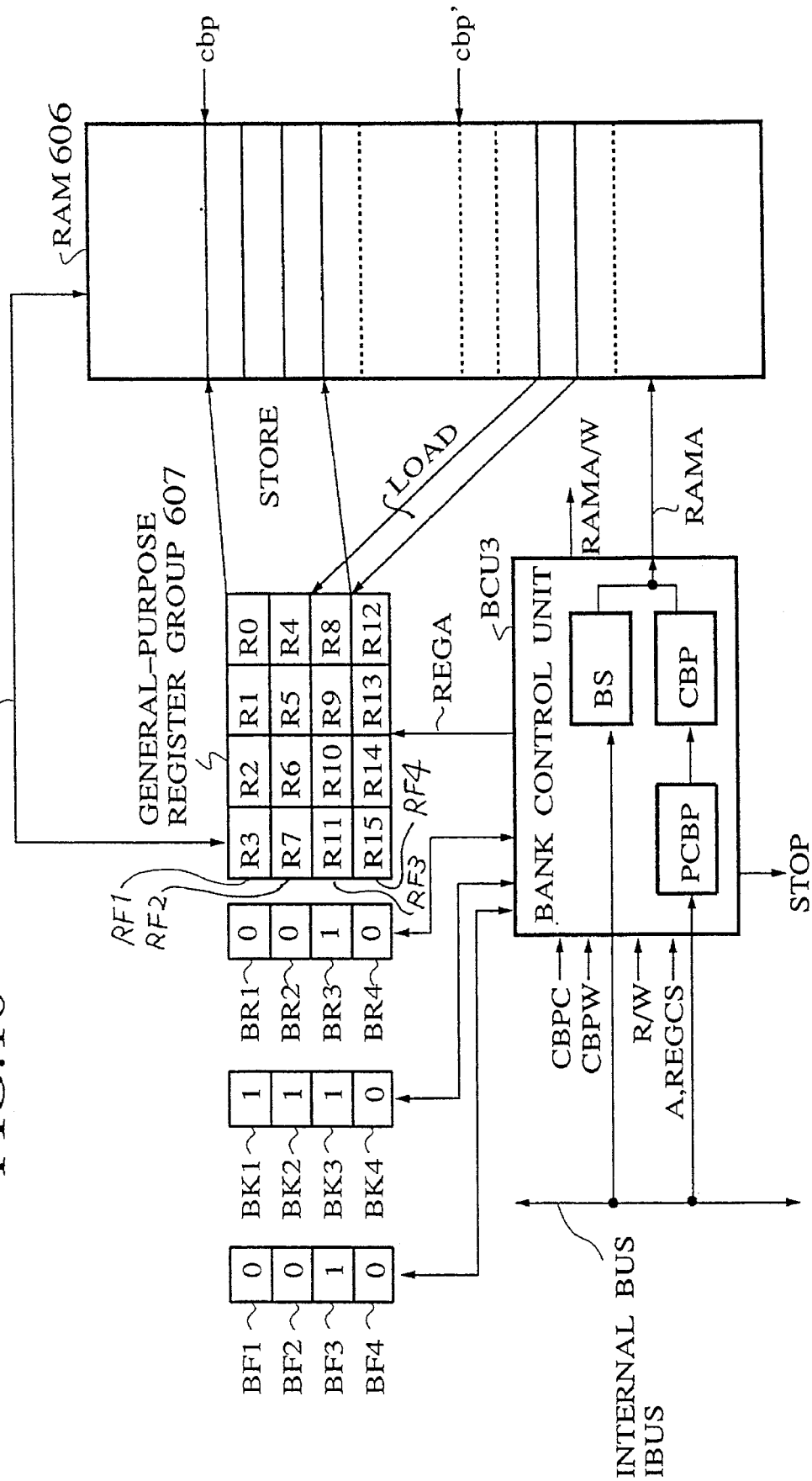
FIG. 16 is a configuration diagram of the bank control unit BCU3.

FIG. 16 shows the relationship among the general-purpose registers 208, the RAM 606, a bank control unit BCU3, and various flags BF1 to BF4, Bk1 to Bk4, and BR1 to BR4.

In FIG. 16, the microprocessor of the present embodiment comprises register banks RF1 to RF4, an exclusive high speed bus 208, reference flags BR1 to BR4, load completion flags BF1 to BF4, rewrite flags BK1 to BK4, and the bank control unit BCU3.

The reference flags BR1 to BR4 are provided to the register banks RF1 to RF4, respectively, for indicating the reference in the subsequent instructions. Also, the store completion flags BF1 to BF4 are also allotted to the register bank RF1 to RF4, respectively, for indicating the completion of the load operation for the register banks RF1 to RF4. The rewrite flags BK1 to BK4 are allotted to the register banks RF1 to RF4, respectively, for indicating the completion of the rewrite of the contents of the register banks RF1 to RF4.

The bank control unit BCU3 has the same configuration as in the second embodiment shown in FIG. 12, comprises the precurrent bank pointer latch PCBP, the current bank pointer CBP, the bank size designation register BS, the register address generator RAG, the adder ADD, and the decoder DEC.

Figure 17:
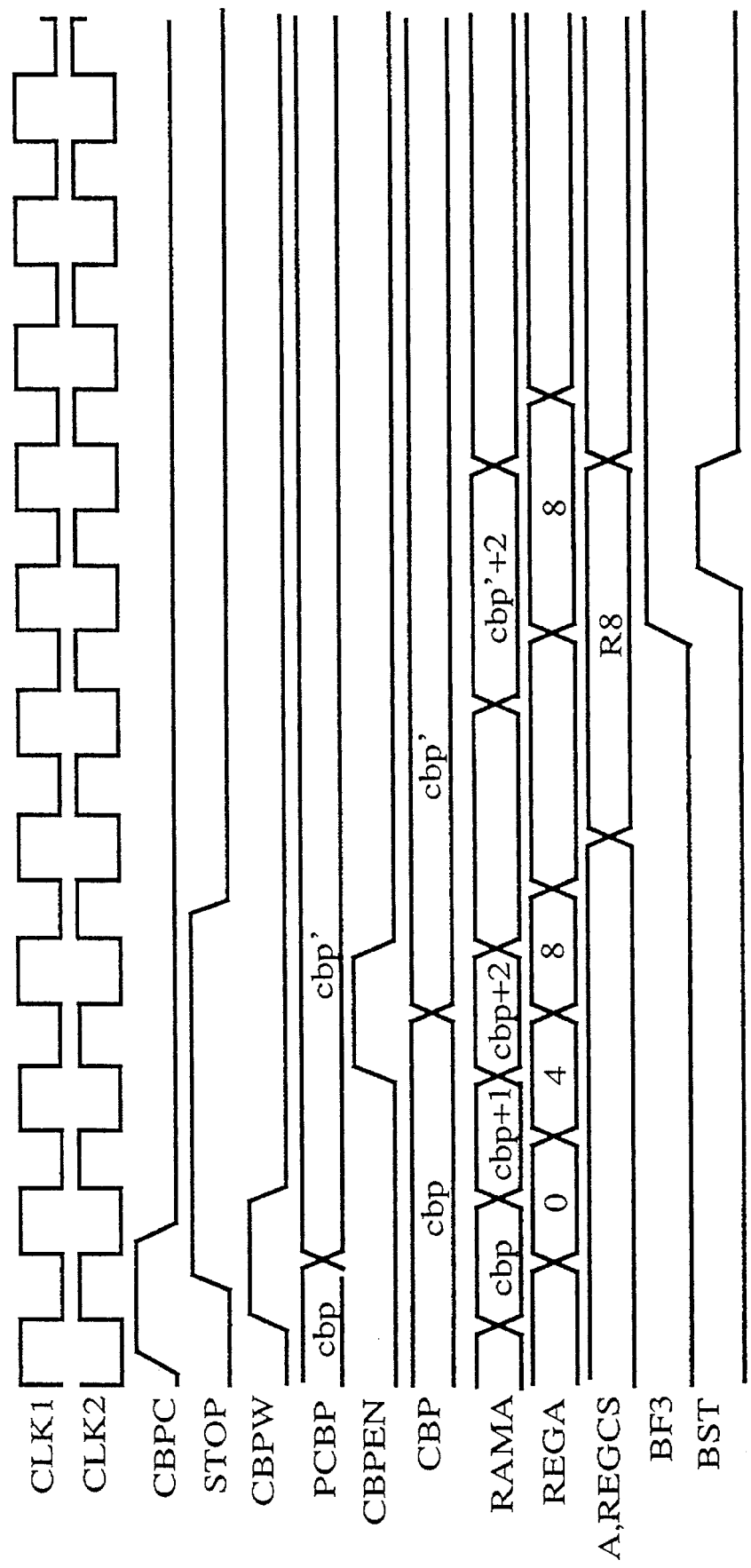
FIG. 17 is a timing chart for explaining the operation of the microprocessor core as the third embodiment of the present invention shown in FIG. 14.

Next, the operation of the third embodiment will be explained with reference to the timing chart of FIG. 17.

The following explanation will be given for a bank size bs=3 specified by the bank size designation register BS.

First, when the current bank pointer CBP is designated in the destination operand in the specified instruction, the register banks, specifically, the first bank RF1, the second bank RF2, and the third bank RF3, designated by the bank size bs in the bank size designation register BS, are stored in the built-in RAM 606, based on the content cbp of the current bank pointer CBP at that time.

This store operation is carried out only in the register bank relating to that the rewrite flags BK1 to BK4 are set. Here, for easy understanding of the explanation, the rewrite flags BK1 to BK3 are set for all the banks RF1 to RF3 in which data has been stored.

In the final cycle of the store operation, a CBP rewrite enable signal CBPEN is generated, and the value cbp in the current bank pointer CBP is changed to the value cbp'.

Following this, in the third embodiment, the data in the general-purpose registers are not stored to the build-in RAM 103. This is the important point of the third embodiment. Simultaneously with the rewrite of the current bank pointer CBP, the level of the bank stop signal STOP is changed and the execution of the next instruction is commenced.

When the access to the general-purpose registers is caused in the execution of the following instructions, a general register access request REGCS is transmitted from the decoder 121 to the bank control unit BCU3. In the bank control unit BCU3 which has received this request REGCS, an address RAMA is calculated for the built-in RAM 606 corresponding to the general-purpose registers for which a read-out has been requested and the data in the RAM 606 designated by the address RAMA is loaded to the register banks RF1 to RF3.

In the case of the third embodiment, as shown in FIGS. 14 to 17, after the change of the level of the bank stop signal STOP, the general register access request KEGCS to the general-purpose register R8, and the bank control unit BCU3 calculates the address RAMA (=8) for the built-in RAM 606 corresponding to the general purpose register R8, and the data for this address region are loaded from the RAM 606 to the third bank RF3 to which the general purpose register R8 is belonged. The load completion flag BF3 is set to "1", a bus start signal BST is transmitted from the bus interface unit, and the general purpose register R8 is accessed by the instruction.

The rewrite flags BK1 to BK4 are reset when the store operation is completed, and then the rewrite flag BK3 is set to "1" when the write-in access operation to the general-purpose register R8 is executed.

With a method of this type, when the bank switch operation is performed based on the current bank pointer CBP, the register bank to which there in no access operation, the current bank pointer CBP stores the old data. Accordingly, during the store operation, only the register banks relating to that the rewrite flag is set are stored to the built-in RAM 606. Also, only data in the regions in the built-in RAM 606 designated by the value cbp' in the current bank pointer CBP is loaded to the register bank wherein a reference flag is set.

As outlined above, in the microprocessor as the third embodiment of the present invention, data having the bank size designated by the bank size designation register BS is stored/loaded, in the same manner as with the first and second embodiments, so that it is possible to reduce the waiting time for executing the next instruction when the bank is switched. In addition, the store operation is carried out only for the register banks in which the rewrite flags BK1 to BK4 are set, therefore wasteful rewrite operations can be eliminated and the instructions can be executed at high speed.

Furthermore, after the store operation, the execution of the subsequent instruction is stopped, and then only reference flags RF1 to RF4 relating to the register banks which are accessed by the following instruction are set. Thereby, the load operation is carried out only for the banks in which reference flags have been set. Therefore wasteful rewrite operations can be eliminated and the instructions can be executed at high speed.

Fourth embodiment

Figure 18:
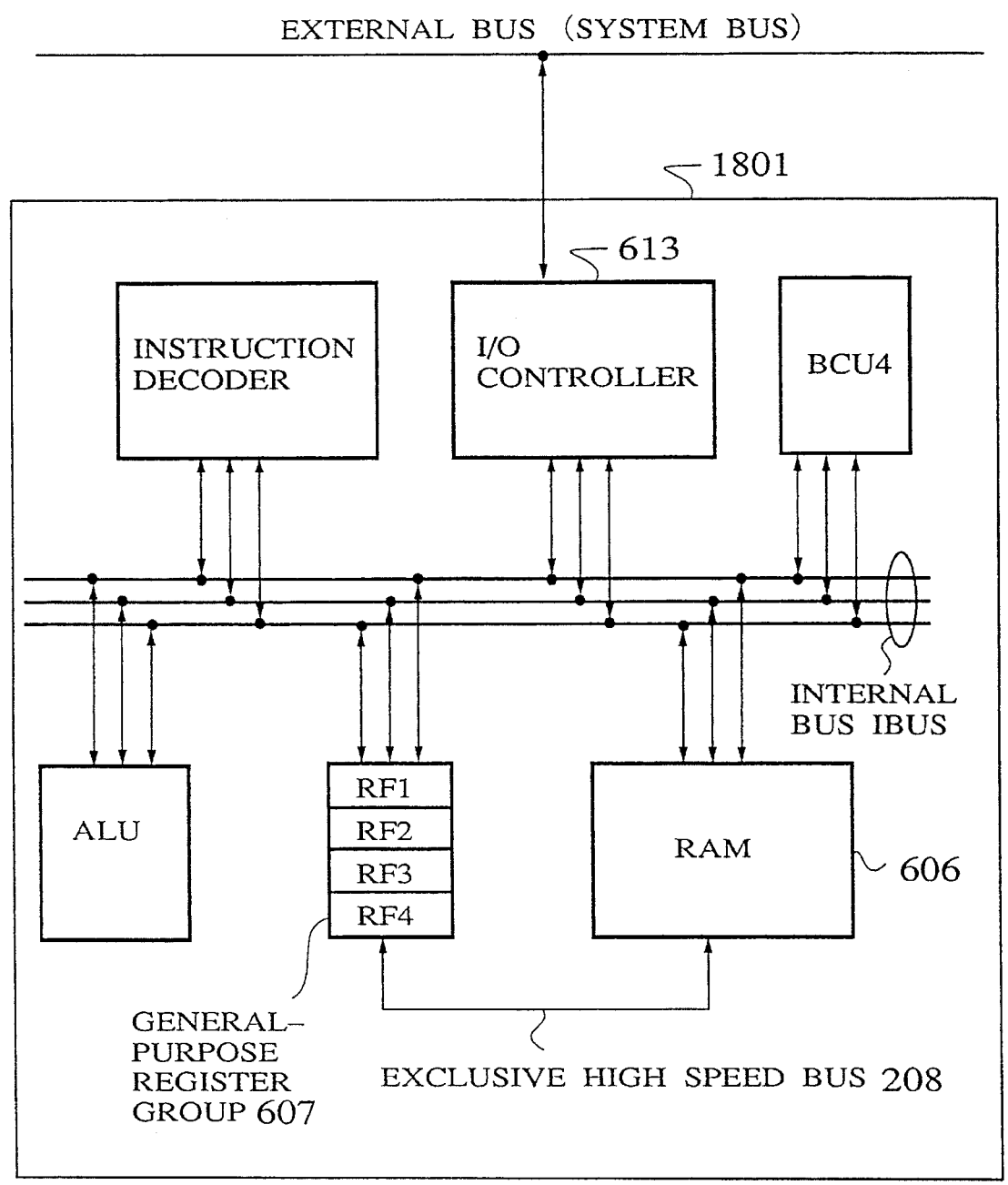
FIG. 18 is a general configuration diagram of a microprocessor core in a microprocessor as a fourth embodiment of the present invention.

FIG. 18 is a general configuration diagram of microprocessor core 1801 in a microprocessor as a fourth embodiment of the present invention.

Figure 19:
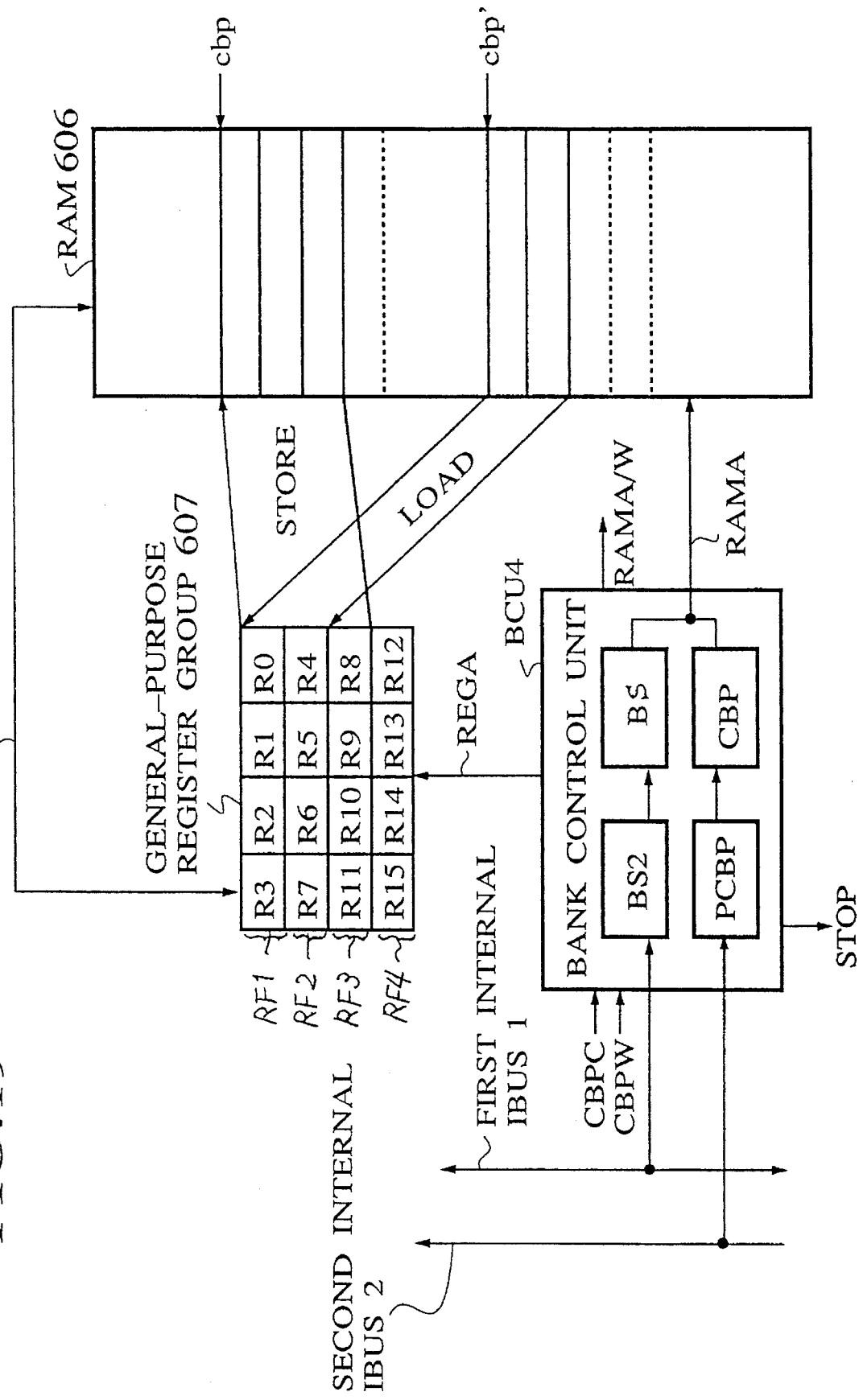
FIG. 19 is a connection relationship among a general-purpose registers, a build-in RAM, and a bank control unit BCU4 as components in the microprocessor core shown in FIG. 18.

FIG. 19 shows the connection relationship among the components of the microprocessor core 1801 such as the register banks RF1 to RF4, the build-in RAM 606, and a bank control unit BCU4. In FIG. 19, the microprocessor core 1801 of the present embodiment comprises the register banks RF1 to RF4, the exclusive high speed bus 208 through which the register banks RF1 to RF4 are connected to the built-in RAM 606, and the bank control unit BCU4 for controlling bank switching.

Figure 20:
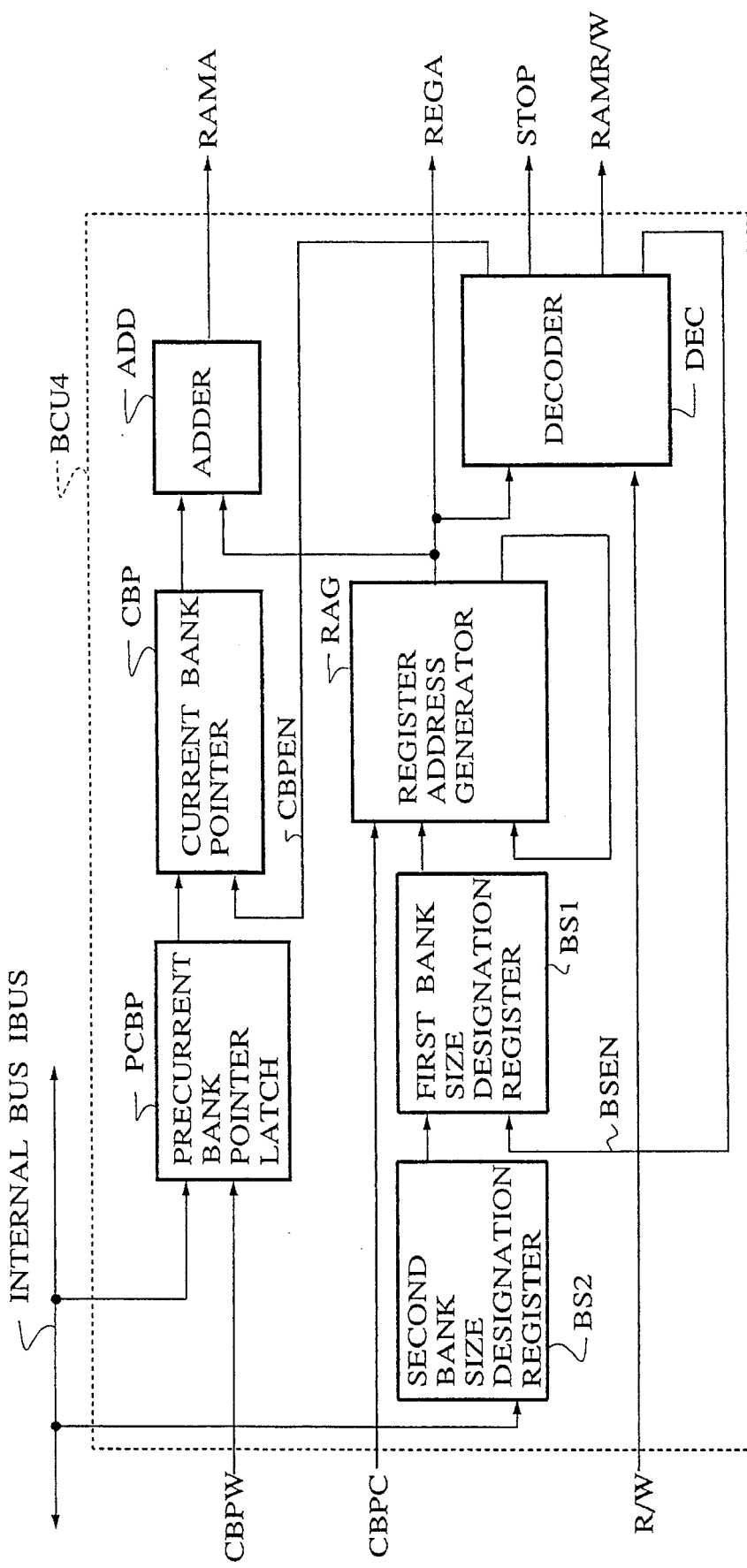
FIG. 20 is a configuration diagram of the bank control unit BCU4.

The bank control unit BCU4, as shown in FIG. 20, comprises a precurrent bank pointer latch PCBP, a current bank pointer CBP, a first bank size designation register BS1, a second bank size designation register BS2, a register address generator RAG, an adder ADD, and a decoder DEC.

The precurrent bank pointer latch PCBP is addressed as a destination of a specified instruction. In the precurrent bank pointer latch PCBP, an address data cbp' which indicates regions in the RAM 606 to be loaded to the register banks RF1 to RF4 through the exclusive high speed bus 208.

The current bank pointer CBP stores the address data cbp for store regions when storing the contents of the register banks RF1 to RF4 to the built-in RAM 606.

The first bank size designation register BS1 designates the bank size for storing during the store operation from the register banks to the RAM 606. The second bank size designation register BS2 designates the bank size for load during the load operation from the RAM 606 to the register banks.

The functions of the register address generator RAG and the decoder DEC are the same as in the first embodiment.

Figure 21:
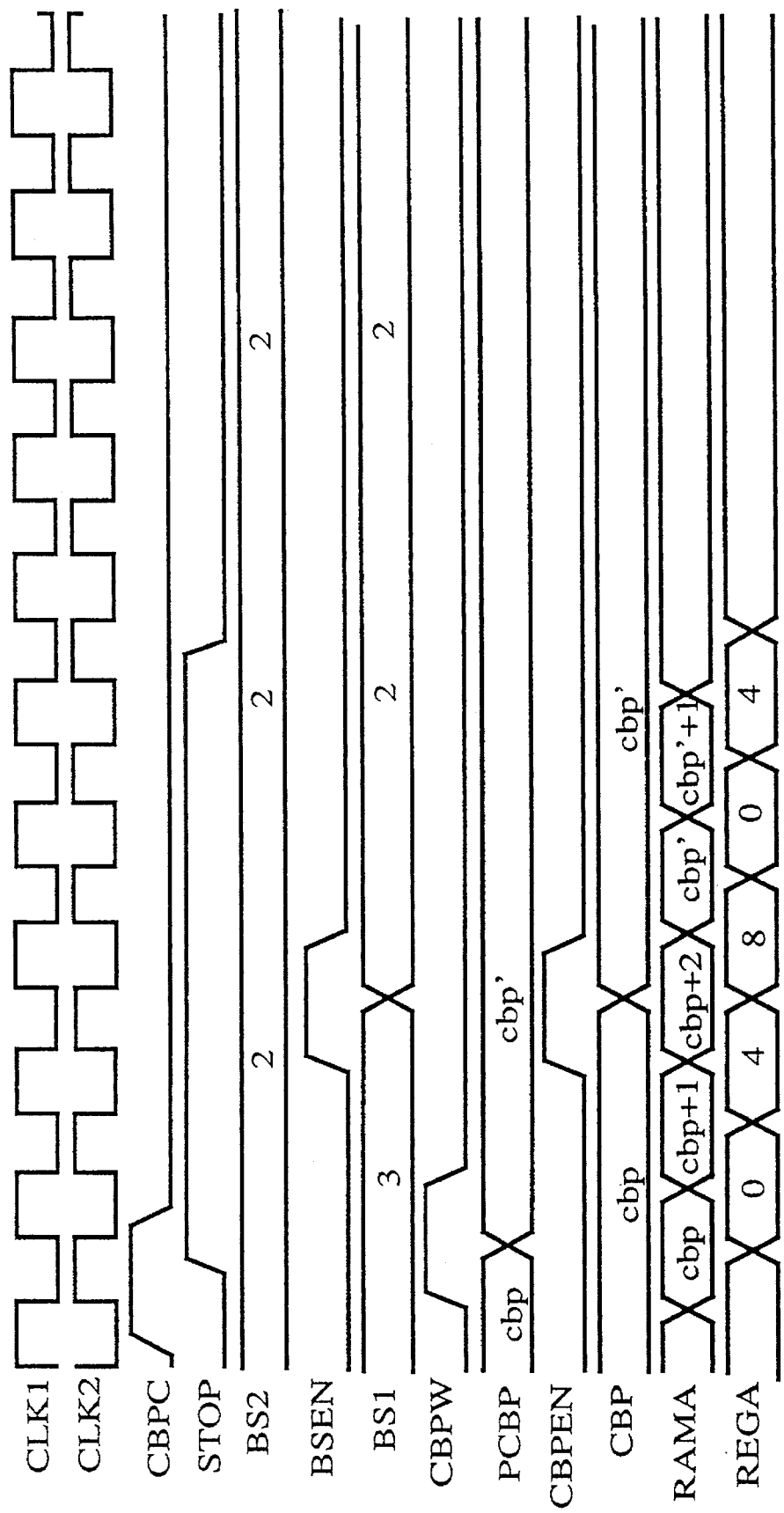
FIG. 21 is a timing chart for explaining the operation of the microprocessor core as the fourth embodiment of the present invention shown in FIG. 18.

Next, the operation of the microprocessor as the fourth embodiment will be explained with reference to the timing chart of FIG. 21. The following explanation will be given for a bank size bs1=3 specified by the first bank size designation register BS1, and for a bank size bs2=2 designated by the second bank size designation register BS2.

In the present embodiment, after rewriting the current bank pointer CBP, when the required number of register banks differs from the number of register banks used up until that time, the contents of the second bank size designation register BS2 are set to the required number by a load instruction prior to rewriting the content of the current bank pointer CBP.

Accordingly, in the microprocessor core 1801 of the current embodiment, the instruction for rewriting the current bank pointer CBP is used as one group of rewrite instructions for the second bank size designation register BS2.

First, when the precurrent bank pointer latch PCBP is designated in the destination operand in the specified instruction, the contents of the register banks designated by a bank size bs1 stored in the first bank size designation register BS1, specifically, the first register bank RF1, the second register bank RF2, and the third register bank RF3, are stored into the built-in RAM 606, based on the contents cbp of the current bank pointer CBP at that time.

Specifically, when the bank control unit CBU4 receives a current bank pointer store control signal CBPC, the bank control unit CBP4 receives a CBP write signal CBPW from a bus interface unit and the precurrent bank pointer latch PCBP in the bank control unit BCU4 latches a new current bank pointer value cbp' through the internal bus IBUS, simultaneously with the storing of the first register bank RF1.

The current bank pointer CBP is changed to the value cbp' in the cycle which completes the store operation, and, simultaneously, the contents bs2 of the second bank size designation register BS2 are loaded into the first bank size designation register BS1.

In the same manner as in the store operation, the load operation to the general-purpose register is performed according to the content of the first bank size designation register BS1, and the value of the first bank size designation register BS1 at that time is renewed to bs2=2. The data designated by the register bank size bs2 portion are loaded from the RAM 606 to the first register bank RF1 and the second register bank RF2.

In this manner, in the microprocessor of the fourth embodiment of the present invention, because only the data designated by the bank size in the first bank size designation register BS1 are stored, and only the data designated by the bank size in the second bank size designation register BS2 are loaded to the register banks, the store/load operations are not performed for unused register banks as is done conventionally, so that it is possible to reduce the waiting time for executing the next instruction when the bank is switched.

Fifth embodiment

Figure 22:
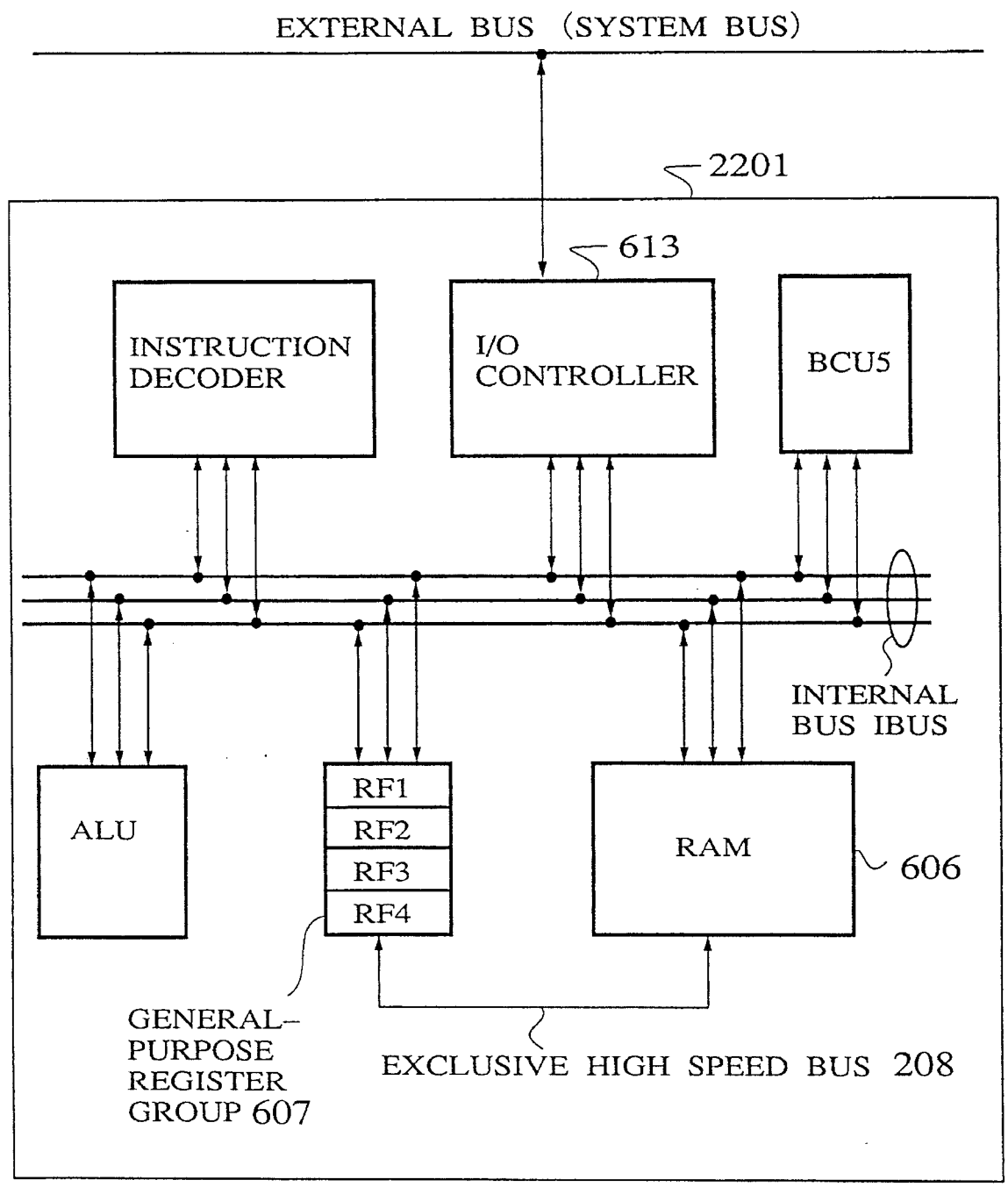
FIG. 22 is a general configuration diagram of a microprocessor core in a microprocessor as a fifth embodiment of the present invention.

FIG. 22 is a general configuration diagram of microprocessor core 2201 in a microprocessor as a fifth embodiment of the present invention.

Figure 23:
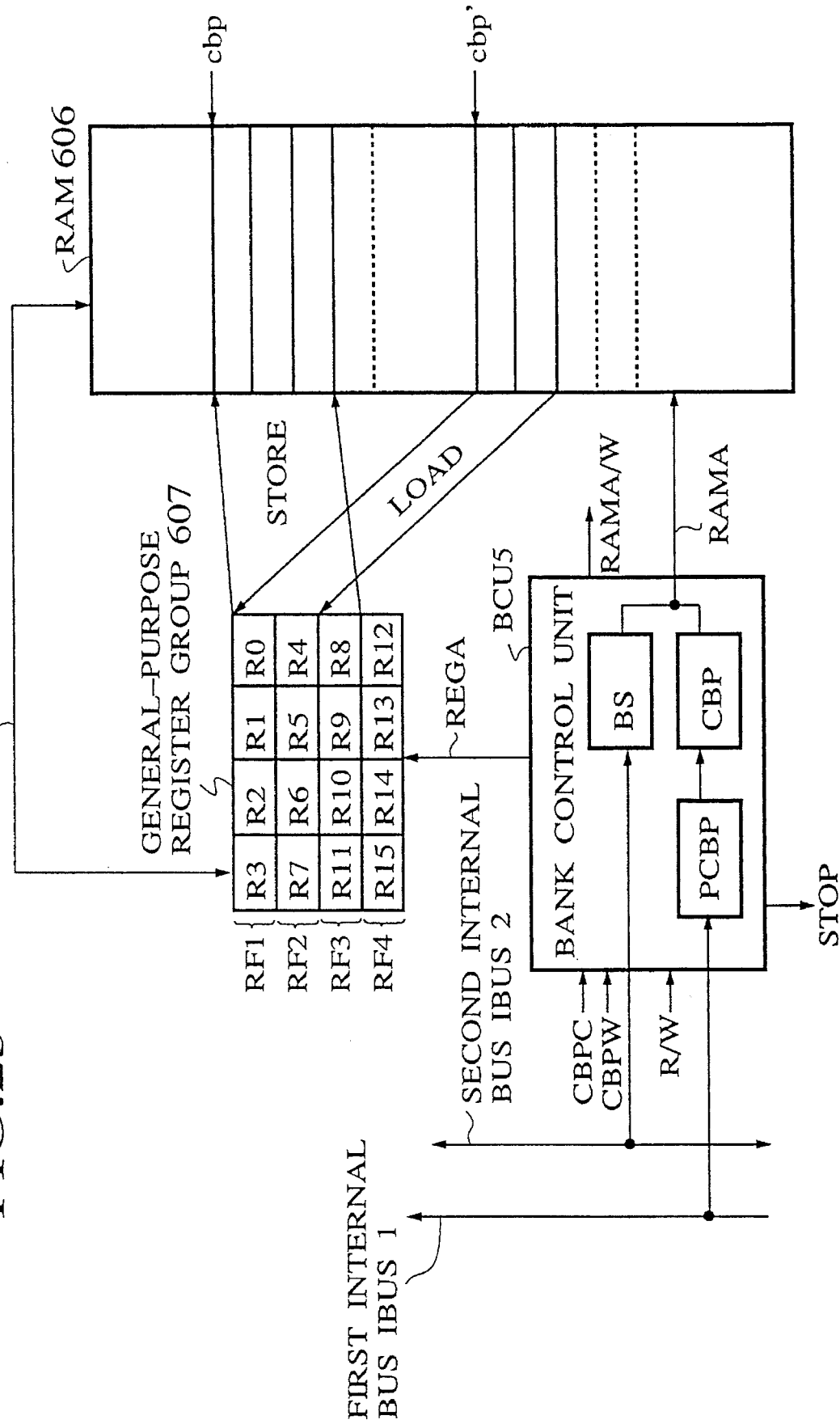
FIG. 23 is a connection relationship among a general-purpose registers, a build-in RAM, and a bank control unit BCU5 as components in the microprocessor core shown in FIG. 18.

FIG. 23 shows the connection relationship among the components of the microprocessor core 2201 such as the register banks RF1 to RF4, the build-in RAM 606, and a bank control unit BCU5. In FIG. 23, the microprocessor core 2201 of the present embodiment comprises the register banks RF1 to RF4, the exclusive high speed bus 208 through which the register banks RF1 to RF4 are connected to the built-in RAM 606, and the bank control unit BCU5 for controlling bank switching.

As shown in FIG. 23, in the bank switching method of the microprocessor core 2201 of the present invention, a special instruction for rewriting the current bank pointer CBP is provided. By setting the values of the current bank pointer CBP and the bank size designation register BS into the operands in the instructions, these values of the current bank pointer CBP and the bank size designation register BS are changed simultaneously.

In FIG. 23, the microprocessor core 2201 of the present embodiment comprises register banks RF1 to RF4, the high speed bus 208 through which the register banks RF1 to RF4 are connected to the built-in RAM 606, and the bank control unit BCU5 for controlling bank switching.

Figure 24:
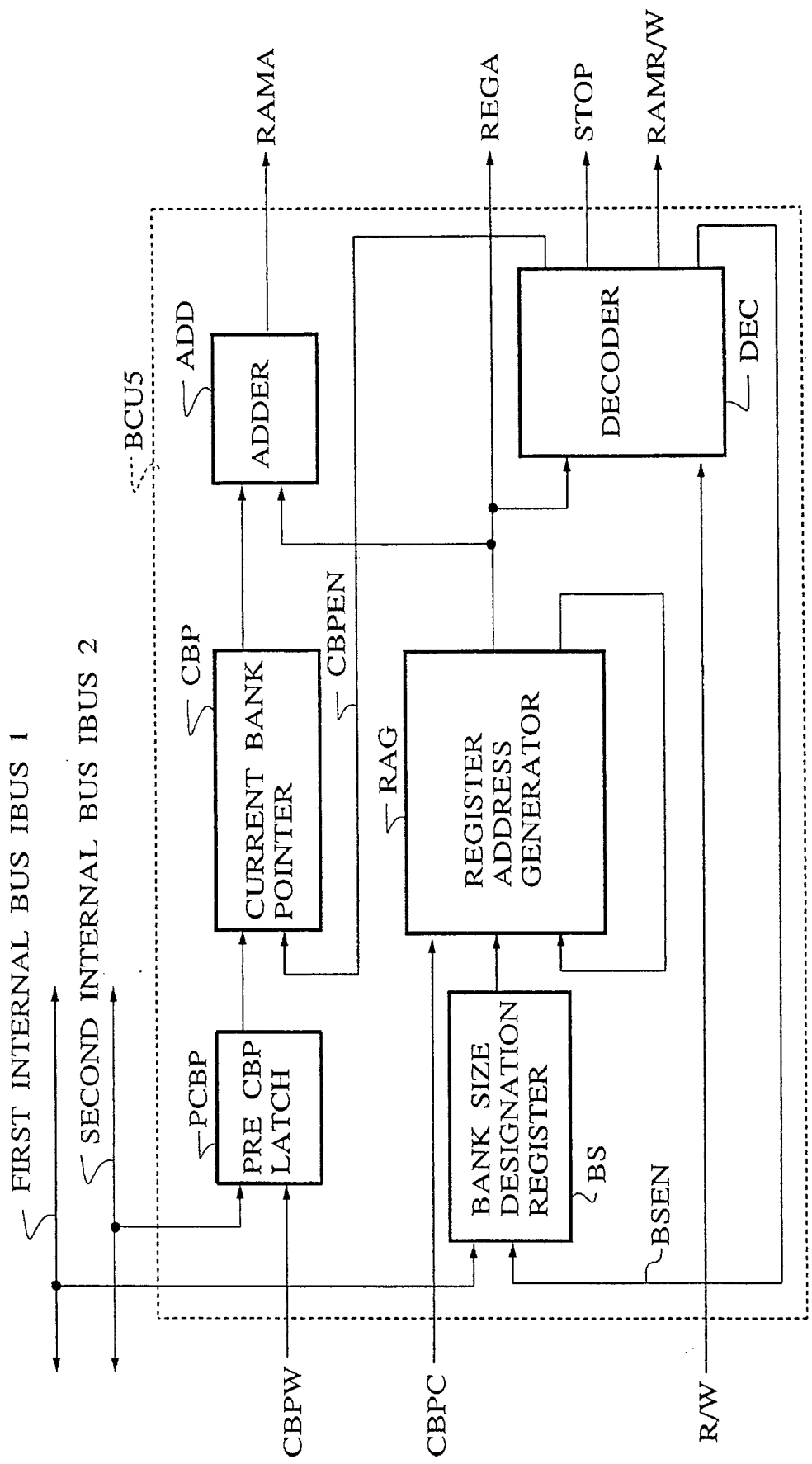
FIG. 24 is a configuration diagram of the bank control unit BCU5.

The bank control unit BCU5, as shown in FIG. 24, comprises a precurrent bank pointer latch PCBP, a current bank pointer CBP, a bank size designation register BS, a register address generator RAG, an adder ADD, and a decoder DEC.

The precurrent bank pointer latch PCBP is set as the destination of the special instruction. The address data cbp' for all regions to be loaded from the built-in RAM 606 to the bank registers RF1 to RF4 is set to the precurrent bank pointer latch PCBP via a second internal bus IBUS2.

The current bank pointer CBP stores address data cbp for store regions when storing the contents of the bank registers RF1 to RF4 to the built-in RAM 606.

The bank size designation register BS is designated as the destination of the special instruction. The bank size to be stored or loaded during the store or load operation is set via a first internal bus IBUS1.

The functions of the register address generator RAG and the decoder DEC are the same as in the first embodiment shown in FIGS. 6 to 9.

Figure 25:
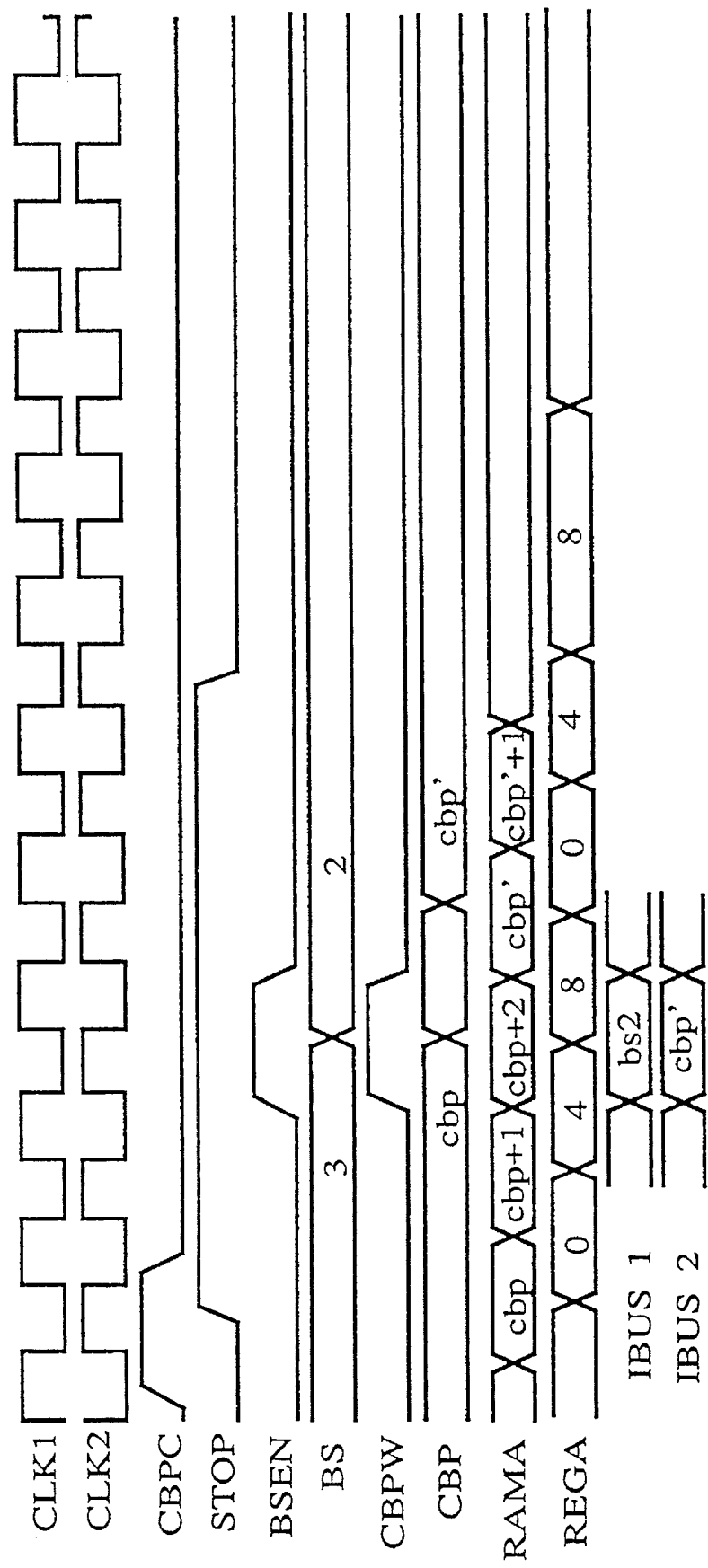
FIG. 25 is a timing chart for explaining the operation of the microprocessor core as the fifth embodiment of the present invention shown in FIG. 22.

Next, the operation of the microprocessor core 2201 as the fifth embodiment will be explained with reference to the timing chart of FIG. 25. In the following explanation, the bank size designation register BS is set in advance to a bank size bs1=3, and the explanation will be given for a bank size bs2=2 set by the special instruction.

First, the precurrent bank pointer latch PCBP is designated in the destination operand in the special instruction. When the bank control unit BCU5 receives a current bank pointer storage control signal CBPC, the precurrent bank pointer latch PCBP receives a CBP write signal CPBW from a bus interface unit simultaneously with the storing of the first bank RF1, and a new current bank pointer value cbp' from the second internal bus IBUS2 is latched in the precurrent bank pointer latch PCBP.

The content of the current bank pointer CBP is rewritten as cbp' in the final cycle of the store operation for the register bank RF3. Simultaneously, one more operand in the special instruction is taken from the second internal bus IBUS2 to renew the contents of the bank size designation register BS as bs2. Accordingly, in the load operation to the general-purpose register group, the data designated by the bus size bs2 are loaded from the built-in RAM 606 to the first bank register RF1 and the second bank register bank RF2.

In the case of the configuration which does not have the precurrent bank pointer latch PCBP, the values bcp' and bs2 are stored in a data register and controlled so that the current bank pointer CBP and the bank size designation register BS are rewritten simultaneously in the final cycle of storing the contents of the general-purpose registers to the RAM 606.

In this manner, in the microprocessor of the fifth embodiment, because only data designated by the bank size in advance in the bank size designation register BS are stored, and because only data designated by the bank size set in the operand in the special instruction is loaded from the RAM 606 to the bank registers, storing/loading operations are not performed for unused register banks as is done conventionally, so that it is possible to reduce the waiting time for executing the next instruction when the bank is switched.

While the above provides a full and complete disclosure of the preferred embodiments of the present invention, various modifications, alternate constructions and equivalents any be employed without departing from the true spirit and scope of the invention. Therefore the above description and illustration should not be construed as limiting the scope of the invention, which is defined by the appended claims.

What is claimed is:

1. A microprocessor having a register bank architecture for executing instructions, comprising:

register bank means comprising n register banks (where n is a positive integer), each of said n register banks comprising a plurality of general-purpose registers;

memory means for storing data of said register bank means;

bus means for connecting said register bank means and said memory means;

bank control means for controlling a data store operation for storing data in said register bank means to said memory means and for controlling a data load operation for loading data in said memory means to said register bank means; and n reference flags provided to each of said n register banks for indicating those of said n register banks which are referenced by subsequent instructions after said data store operation and said data load operation are completed, said bank control means comprising:
 a current bank pointer for storing address data indicating a data region in said memory means to which data contained in one of said register banks is saved or from which data contained in one of said register banks is restored; and
 a bank size designation register for storing bank size data indicating a bank size to be stored and to be loaded during the data store operation and the data load operation, wherein when an address of said current bank pointer is set in a destination operand in an instruction, said bank control means receives the content of said current bank pointer and the content of said bank size designation register, and said bank control means controls said data store operation for said n register banks designated by the contents of said current bank pointer and said bank size designation register in order to save data of the bank size as specified by said bank size designation register to said memory means, said bank control means changes the content of said current bank pointer with the content of the destination operand in said instruction after the completion of said data store operation, said bank control means receives the content of said current bank pointer and the content of said bank size designation register, and said bank control means controls said data load operation for said memory means by the contents of said current bank pointer and said bank size designation register in order to restore data of the bank size as specified by said bank size designation register to said memory means, and wherein said bank control means sets said n reference flags after said data store operation and said data load operation have been completed, said microprocessor restarts the execution of said subsequent instructions, and said bank control means controls subsequent data load operations for only those of said n register banks for which said reference flags have been set.

2. A microprocessor as claimed in claim 1, further comprising:

n load completion flags provided to each of said n register banks, each for indicating that said data load operation has been completed in a corresponding register bank, wherein after the data store operation is completed, subsequent instructions are executed by said microprocessor, a subsequent data load operation is executed, and said bank control means sets said n load completion flags only for said n register banks for which said data load operation has been completed, and wherein the subsequent instructions use of said n register banks commences only after the n load completion flags are set.

3. A microprocessor as claimed in claim 2, further comprising n rewrite flags (n is a positive integer) provided to each of said n register banks for indicating that the contents of said n register banks have been rewritten, wherein said bank control means controls said data store operation for said n register banks only for said n rewrite flags have been set.

4. A microprocessor as claimed in claim 2, further comprising:

a first bank size designation register for designating the bank size of said n register banks for said data store operation; and a second bank size designation register for designating the bank size of said n register banks for said data load operation, wherein said bank control means receives the content of said first bank size designation register and controls said data store operation only for said n register banks designated by the content of said first bank size designation register, and said bank control means receives the content of said second bank size designation register and controls said data load operation only for said n register banks designated by the content of said second bank size designation register.

5. A microprocessor as claimed in claim 2, wherein said instructions include a special instruction, the address of said current bank pointer and the address of said bank size designation register are set in an operand part in said special instruction.

6. A microprocessor as claimed in claim 2, further comprising a precurrent bank pointer latch whose address is set in the destination in said instructions, wherein said bank control means receives a content of said current bank pointer and controls said data store operation for said register banks designated by the content of said current bank pointer, and said bank control means receives a content of said precurrent bank pointer latch and controls said data load operation for said memory means designated by the content of said precurrent bank pointer latch.

7. A microprocessor as claimed in claim 1, further comprising n rewrite flags (n is a positive integer) provided to each of said n register banks for indicating that the contents of said n register banks have been rewritten, wherein said bank control means controls said data store operation for said n register banks only for said n rewrite flags have been set.

8. A microprocessor as claimed in claim 7, further comprising:

a first bank size designation register for designating the bank size of said n register banks for said data store operation; and a second bank size designation register for designating the bank size of said n register banks for said data load operation, wherein said bank control means receives the content of said first bank size designation register and controls said data store operation only for said n register banks designated by the content of said first bank size designation register, and said bank control means receives the content of said second bank size designation register and controls said data load operation only for said n register banks designated by the content of said second bank size designation register.

9. A microprocessor as claimed in claim 7 wherein said instructions include a special instruction, the address of said current bank pointer and the address of said bank size designation register are set in an operand part in said special instruction.

10. A microprocessor as claimed in claim 7, further comprising a precurrent bank pointer latch whose address is set in the destination in said instructions, wherein said bank control means receives a content of said current bank pointer and controls said data store operation for said register banks designated by the content of said current bank pointer, and said bank control means receives a content of said precurrent bank pointer latch and controls said data load operation for said memory means designated by the content of said precurrent bank pointer latch.

11. A microprocessor as claimed in claim 1, further comprising:

a first bank size designation register for designating the bank size of said n register banks for said data store operation; and a second bank size designation register for designating the bank size of said n register banks for said data load operation, wherein said bank control means receives the content of said first bank size designation register and controls said data store operation only for said n register banks designated by the content of said first bank size designation register, and said bank control means receives the content of said second bank size designation register and controls said data load operation only for said n register banks designated by the content of said second bank size designation register.

12. A microprocessor as claimed in claim 11, wherein said instructions include a special instruction, the address of said current bank pointer and the address of said bank size designation register are set in an operand part in said special instruction.

13. A microprocessor as claimed in claim 11, further comprising a precurrent bank pointer latch whose address is set in the destination in said instructions, wherein said bank control means receives a content of said current bank pointer and controls said data store operation for said register banks designated by the content of said current bank pointer, and said bank control means receives a content of said precurrent bank pointer latch and controls said data load operation for said memory means designated by the content of said precurrent bank pointer latch.

14. A microprocessor as claimed in claim 1, wherein said instructions include a special instruction, the address of said current bank pointer and the address of said bank size designation register are set in an operand part in said special instruction.

15. A microprocessor as claimed in claim 1, further comprising a precurrent bank pointer latch whose address is set in the destination in said instructions, wherein said bank control means receives a content of said current bank pointer and controls said data store operation for said register banks designated by the content of said current bank pointer, and said bank control means receives a content of said precurrent bank pointer latch and controls said data load operation for said memory means designated by the content of said precurrent bank pointer latch.

16. A microprocessor as claimed in claim 15, further comprising a precurrent bank pointer latch whose address is set in the destination in said instructions, wherein said bank control means receives a content of said current bank pointer and controls said data store operation for said register banks designated by the content of said current bank pointer, and said bank control means receives a content of said precurrent bank pointer latch and controls said data load operation for said memory means designated by the content of said precurrent bank pointer latch.

* * * * *